(12) United States Patent
Lowery et al.

(10) Patent No.: US 8,756,342 B1
(45) Date of Patent: Jun. 17, 2014

(54) METHOD AND APPARATUS FOR CONTENT SYNCHRONIZATION

(75) Inventors: Keith A. Lowery, Richardson, TX (US); David K. Davidson, Dallas, TX (US); Avinash C. Saxena, Plano, TX (US)

(73) Assignee: Parallel Networks, LLC, Dallas, TX (US)

( * ) Notice: Subject to any disclaimer, the term of this patent is extended or adjusted under 35 U.S.C. 154(b) by 1303 days.

(21) Appl. No.: 09/590,760

(22) Filed: Jun. 8, 2000

Related U.S. Application Data

(60) Provisional application No. 60/180,843, filed on Feb. 7, 2000.

(51) Int. Cl.
*G06F 15/16* (2006.01)
*G06F 17/30* (2006.01)
*H04L 29/08* (2006.01)

(52) U.S. Cl.
CPC ...... *G06F 17/30902* (2013.01); *G06F 17/3089* (2013.01); *H04L 67/2842* (2013.01)
USPC .......................................................... 709/246

(58) Field of Classification Search
CPC .......... G06F 17/3089; G06F 17/30902; H04L 67/2842
USPC ......... 709/217, 203, 219, 248, 206, 207, 226, 709/223, 246; 707/10
See application file for complete search history.

(56) References Cited

U.S. PATENT DOCUMENTS 5,440,741 A 8/1995 Morales et al.
5,774,660 A 6/1998 Brendel et al.
(Continued)

FOREIGN PATENT DOCUMENTS

EP 0 935 194 A2 8/1999
EP 0 943 992 A2 9/1999

OTHER PUBLICATIONS

XP-000740725: Author: Pei Cao and Chengjie Liu, "Maintaining Strong Cache Consistency in the World Wide Web", IEEE Transactions on Computers, vol. 47, No. 4, pp. 455-457, Apr. 1, 1998.

(Continued)

*Primary Examiner* — Kristie Shingles
(74) *Attorney, Agent, or Firm* — Baker Botts L.L.P.

(57) ABSTRACT

A data center (14) receives a request (22) for content from a browser (12) on a client (11). The data center determines whether the requested content is available at the data center. The content is available when the content is both present at the data center and current. The content may be expired and marked as non-available in response to an expiration command (24). When the requested content is available at the data center, the data center returns the requested content to the data center. When the requested content is locally unavailable at the data center, the requested content is retrieved from an origin server (18). The retrieval of the content from the origin server may be delayed based on the processing load at the origin server. When retrieval of the content is delayed, the request is prioritized and placed in a queue for handling by the origin server based on the priority of the request. Also, when retrieval of the content is delayed, a status page may be communicated to the browser to inform a user of the delay and provide alternate content (139) and status information related to the request determined as a function of the request or the current state of the origin server.

25 Claims, 4 Drawing Sheets

(56) References Cited

U.S. PATENT DOCUMENTS

| | | | |
|---|---|---|---|
| 5,829,002 A | 10/1998 | Priest | 707/10 |
| 5,835,757 A | 11/1998 | Oulid-Aissa et al. | 395/610 |
| 5,852,812 A | 12/1998 | Reeder | |
| 5,857,188 A * | 1/1999 | Douglas | 707/9 |
| 5,857,189 A | 1/1999 | Riddle | |
| 5,940,594 A | 8/1999 | Ali et al. | |
| 5,951,694 A | 9/1999 | Choquier et al. | |
| 5,956,489 A | 9/1999 | San Andres et al. | |
| 5,974,443 A | 10/1999 | Jeske | |
| 5,991,810 A | 11/1999 | Shapiro et al. | |
| 6,023,722 A | 2/2000 | Colyer | |
| 6,038,601 A * | 3/2000 | Lambert et al. | 709/226 |
| 6,055,564 A | 4/2000 | Phaal | |
| 6,119,153 A * | 9/2000 | Dujari et al. | 709/218 |
| 6,147,977 A | 11/2000 | Thro et al. | |
| 6,154,811 A * | 11/2000 | Srbljic et al. | 711/118 |
| 6,173,368 B1 * | 1/2001 | Krueger et al. | 711/135 |
| 6,219,676 B1 * | 4/2001 | Reiner | 1/1 |
| 6,233,606 B1 * | 5/2001 | Dujari | 709/213 |
| 6,249,804 B1 * | 6/2001 | Lam | 709/203 |
| 6,304,913 B1 | 10/2001 | Rune | |
| 6,314,463 B1 | 11/2001 | Abbott et al. | |
| 6,336,135 B1 | 1/2002 | Niblett et al. | |
| 6,356,936 B1 * | 3/2002 | Donoho et al. | 709/206 |
| 6,442,601 B1 * | 8/2002 | Gampper et al. | 709/218 |
| 6,445,680 B1 | 9/2002 | Moyal | |
| 6,453,339 B1 | 9/2002 | Schultz et al. | |
| 6,510,458 B1 * | 1/2003 | Berstis et al. | 709/219 |
| 6,542,964 B1 * | 4/2003 | Scharber | 711/122 |
| 6,553,409 B1 * | 4/2003 | Zhang et al. | 709/213 |
| 6,578,073 B1 | 6/2003 | Starnes et al. | |
| 6,587,877 B1 | 7/2003 | Douglis et al. | |
| 6,618,751 B1 * | 9/2003 | Challenger et al. | 709/213 |
| 6,658,417 B1 * | 12/2003 | Stakutis et al. | 707/10 |
| 6,658,485 B1 | 12/2003 | Baber et al. | |
| 6,671,737 B1 * | 12/2003 | Snowdon et al. | 709/243 |
| 6,748,385 B1 * | 6/2004 | Rodkin et al. | 707/10 |
| 7,035,943 B2 * | 4/2006 | Yamane et al. | 709/248 |
| 2001/0047392 A1 | 11/2001 | Murphy, Jr. et al. | |
| 2002/0052778 A1 * | 5/2002 | Murphy et al. | 705/14 |
| 2002/0055982 A1 | 5/2002 | Goddard | |
| 2002/0162006 A1 * | 10/2002 | Takahashi et al. | 713/182 |
| 2003/0111592 A1 * | 6/2003 | Al-Ali | 250/214.1 |
| 2006/0047686 A1 | 3/2006 | Dearing et al. | |
| 2007/0136311 A1 | 6/2007 | Kasten et al. | |

OTHER PUBLICATIONS

XP-000852196: Author: Haobo Yu, Lee Breslau, and Scott Shenker, "A Scalable Web Cache Consistency Architecture", Computer Communications Review, Association for Commputing Machinery, vol. 29, No. 4, pp. 163-174, Oct. 1999.

XP-004018195: Author: Adam Dingle and Tomáš Pártl, "Web cache coherence", Computer Networks and ISDN Systems, vol. 28, No. 11, pp. 907-920, May 1, 1996.

PCT Written Opinion (PCT Rule 66), Patent Cooperation Treaty mailed Oct. 16, 2001, corresponding to International Appln. No. PCT/US01/02094 filed Jan. 22, 2001, Applicant's reference 066241. 0114.

U.S. Appl. No. 09/592,486, filed Jun. 8, 2000, by inventors Keith A. Lowery, et al., entitled *"Method and Apparatus for Dynamic Data Flow Control"*, 88 total pages, Jun. 8, 2000.

XP-000740725; Cao, Pei and Liu, Chngjie, "Maintaining Strong Cache Consistency in the World Wide Web", IEEE Transactions on Computers, vol. 47, No. 4, Apr. 1998, pp. 445-457, Apr. 1998.

PCT Written Opinion, Patent Cooperation Treaty mailed Oct. 5, 2001, corresponding to International Appln. No. PCT/US01/02096 filed Jan. 22, 2001.

PCT Notification of Transmittal of the International Search Report or the Declaration, mailed Oct. 19, 2001, corresponding to International Appln. No. PCt/US01/02096 filed Jan. 22, 2001.

SONAR—A Network Proximity Service, draft-moore-sonar-01.txt XP002109464, Keith Moore, et al., University of Tennessee, Network Working Group, Internet-Draft, Feb. 23, 1996.

\* cited by examiner

METHOD AND APPARATUS FOR CONTENT SYNCHRONIZATION

RELATED APPLICATIONS

This application claims the benefit of U.S. Provisional Application Ser. No. 60/180,843, filed Feb. 7, 2000 by Keith A. Lowery, et al., and entitled, "Method and Apparatus for Content Synchronization".

TECHNICAL FIELD OF THE INVENTION

This invention relates in general to client-server systems and, more particularly, to a method and apparatus for content synchronization.

BACKGROUND OF THE INVENTION

As computers have grown increasingly important in today's society, the importance of the Internet has also increased. As increased numbers of users access the Internet, the need for a web server to handle large numbers of data requests has also increased. In addition, as increasing numbers of requests are handled by the Internet, the delay experienced by the user between generating the request and receiving a response is also increasing.

Some traditional solutions to handling large numbers of data requests and decreasing the delay at the web server have involved increasing the processing capability of the web server and distributing the processing of the requests across groups of web servers. Other traditional solutions have involved increasing the bandwidth of the network connection between the Internet and the web server or servers. However, traditional solutions have often failed as the number of requests continue to increase because of the expense associated with maintaining large numbers of web servers and high speed connections to the Internet.

Another traditional solution has involved caching static web data at multiple locations so as to distribute the processing of requests across multiple cache servers and decreasing the network distance between the user and the cache server. This solution has not been effective for web servers utilizing dynamically generated data, such as Active Server Pages. Static caching solutions provide decreased benefit to web servers which utilize dynamic data because the static caching solutions simply pass requests for dynamic data on to the origin server. In many cases, the generation of dynamic data at the web server or servers has become a major bottleneck in handling requests because the web servers are reaching the limits of their processing capabilities. Adding additional web servers is effective as it increases processing capacity, but rapidly becomes cost-prohibitive.

Electronic commerce often involves large amounts of rapidly changing and dynamically generated data. For example, electronic commerce often involves large numbers of products listed in online catalogs. Often, the price and availability of an item listed in the online catalog changes and static caching solutions typically can not handle web pages for the online catalog because of the changing information on the web page. This dynamic nature of electronic commerce renders it largely unsuitable for use with static caching systems.

SUMMARY OF THE INVENTION

From the foregoing, it may be appreciated that a need has arisen for a method and apparatus for content synchronization so as to provide increased efficiency for handling large numbers of requests by a web site.

According to one embodiment of the present invention, a method for processing data is provided that comprises receiving data at a cache server and receiving an expiration command at the cache server from a data center manager. The method further comprises marking the data as expired in response to the expiration command.

According to another embodiment of the present invention, a method for providing efficient data processing service is provided that comprises subscribing an origin server to a data center and intercepting a data request from a browser to the origin server, the data request requesting a content item. The method further comprises communicating the intercepted data request to the data center and determining whether the content item is available at the data center. Also, the method comprises retrieving the content item from the origin server when the content item is unavailable at the data center and communicating the content item to the browser.

According to a further embodiment of the present invention, a system for processing data is provided which comprises a data center operable to receive a request from a client. The system further comprises a data center manager coupled to a data source and the data center. The data source is operable to generate a data change message. The data center manager is operable to receive the data change message and generate an expiration message therefrom.

The present invention provides a number of technical advantages. One such technical advantage is the capability for fine grained control of the expiration time of cached content. Another technical advantage is that the expiration of cached content can be performed dynamically in response to planned data changes as well as unexpected changes in cached data.

BRIEF DESCRIPTION OF THE DRAWINGS

A better understanding of the present invention will be realized from the detailed description that follows, taken in conjunction with the accompanying drawings, in which.

DETAILED DESCRIPTION OF THE INVENTION

Figure 1:
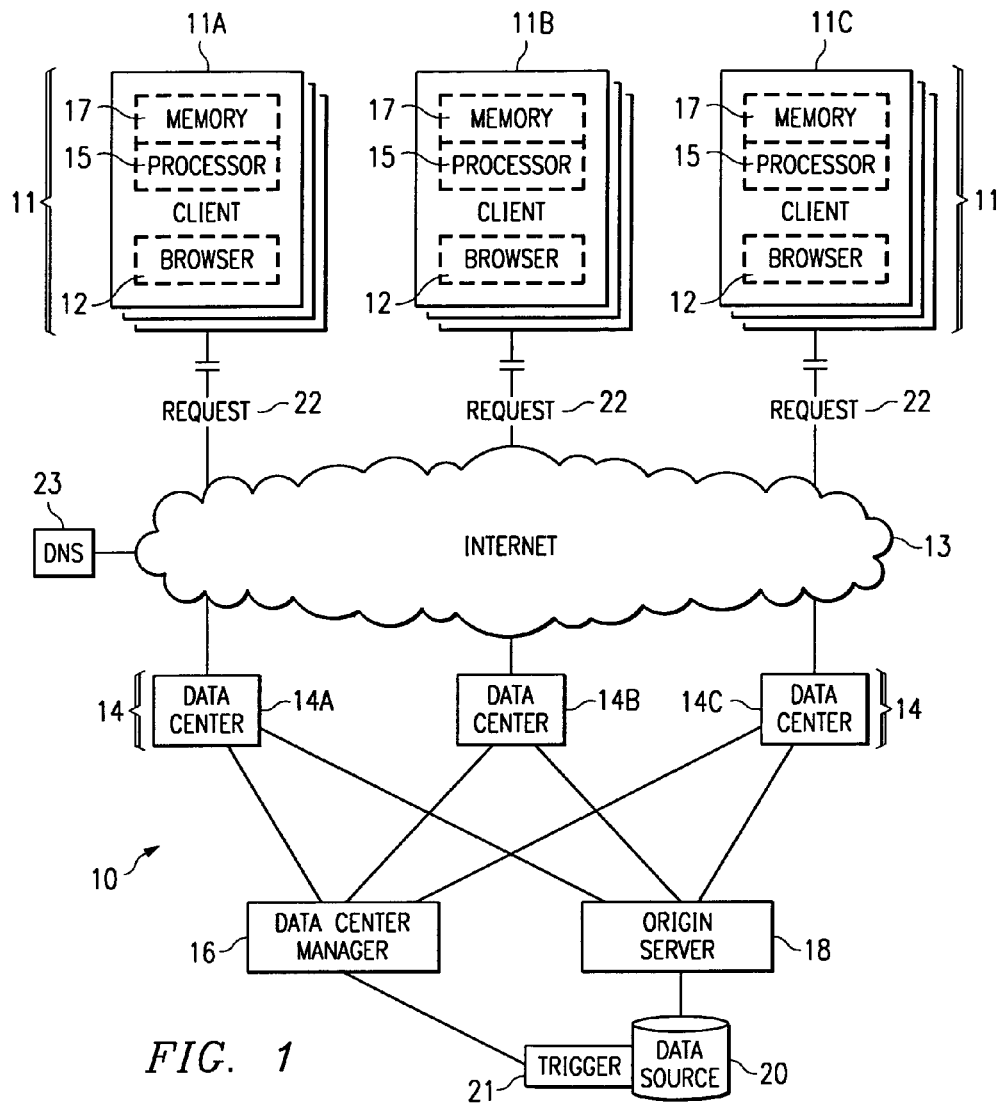
FIG. 1 is a block diagram of a web content caching system.

FIG. 1 is a block diagram of a web content caching system 10. Caching system 10 comprises a plurality of clients 11, a browser 12 executing on client 11, a network 13, one or more data centers 14, a data center manager 16, an origin server 18, a data source 20 and a Domain Name Service (DNS) server 23. Caching system 10 provides increased World Wide Web ("web") performance to clients 11. Performance is increased by caching data at the data centers 14 so that the data is located closer, in terms of network distance, to the clients 11, by decreasing the volume of data requests handled by origin server 18 and by decreasing the volume of dynamic data to be generated by origin server 18. It should be understood that while the disclosed embodiment is discussed in terms of the Internet Protocol (IP), any suitable network protocol could be used, such as Asynchronous Transfer Mode (ATM), frame relay and Fiber Distributed Data Interface (FDDI).

Each client 11 comprises any suitable general purpose or specialized computer system operable to support execution of browser 12. Clients 11 respectively comprise a processor 15 and a computer readable memory 17 coupled to processor 15. Each client 11 is coupled to network 13. Browser 12 executes on client 11 and comprises any suitable Hypertext Transport Protocol (HTTP) client. In the disclosed embodiment, browser comprises a web browser such as Internet Explorer® by Microsoft Corp. of Redmond, Wash. or Netscape Communicator by Netscape Communications Corp. Browser 12 is held in memory 17 and executed by processor 15. Browser 12 transmits and receives data over network 13. Each browser 12 is operable to generate one or more requests 22. Each request is generated by a particular browser 12 in response to a desire for information by a user (not shown) associated with that particular browser 12. Each request 22 comprises a request for one item of content from origin server 18. The requested item of content may further comprises multiple elements of content, for example, a web page with multiple graphic elements therein, but the request is directed to retrieving the single content item while the remaining elements of content in the main content item are retrieved as a function of the single content item. Content comprises static and dynamic audio data, video data, text data, multimedia data, Hypertext Markup Language (HTML) data, binary data and any other suitable types of data capable of being used by browser 12. In the disclosed embodiment, requests 22 are HTTP requests for HTML data, such as web pages. An item of content ("content item") indicates a particular element of content, such as a particular web page, while content refers generally to data available to be retrieved.

Content comprises static information and dynamic information. Static information typically does not change once the content has been created or does not change except slowly over time. Stated another way, static information comprises content that, when created, is expected to remain the same for an indeterminate amount of time. Static information may comprise, for example, text files and pre-existing Hypertext Markup Language (HTML) web pages. For example, a restaurant menu is the same regardless of the user who is accessing the menu because the menu is the same for all people. However, as chefs at the restaurant change over time, the menu may also change. In contrast, dynamic information comprises content that is expected and designed to change. The dynamic content may change based on the data and criteria used for generating the dynamic content, such as a search result page. For example, a search for "mountain lions" will dynamically generate a search result page listing items related to "mountain lions." The dynamic content may also change based on information associated with the page, for example, a page in an online product catalog may change in response to pricing and availability changes, and dynamic content may further change for other suitable reasons. Dynamic information may comprise, for example, the output of Common Gateway Interface (CGI) scripts, search engine results, the output of Structured Query Language (SQL) searches and the SQL search itself, JavaScript, the output of JavaScript scripts, ActiveX controls and the output of ActiveX controls, Active Server Pages, applets and any other suitable dynamic content generation system. Often, the dynamic information will be expressed as a single HTML web page, but the information within the HTML web page has been generated dynamically based on some suitable criteria. For example, the result of a search using a search engine on the Internet returns different information based on the search terms provided by the user. The search results may also depend on one or more attributes associated with the search request, such as geographic location or the current date. Continuing the search engine example, when the user is searching for local businesses, the search results will vary not only on the search terms provided by the user, but also what "local" means with respect to the search request. For another example, a user searching for information about current events will want results that are tailored to the user's search terms, the user's location, and the current date. For yet another example, an online book retailer may provide price information and consumer reviews of books available from the online book retailer. The price information for a particular book may change unexpectedly in response to a sale or a sudden interest in that particular book. Also, the web page listing the book and the consumer reviews changes in response to a consumer entering a new review of the book. One aspect of the system of the present invention allows for the efficient caching of static information that never changes, static information, such as the menu example, that changes infrequently, and some suitable types of dynamic information.

Network 13 comprises any suitable data networking system for communicating data between computer systems. For example, network 13 may be the Internet, an asynchronous transfer mode ("ATM") network, an Ethernet network, a Transmission Control Protocol/Internet Protocol (TCP/IP) network, an intranet or any other suitable computer networking technologies. For purposes of teaching the present invention, an exemplary embodiment will be described where network 13 comprises the Internet.

Data centers 14 cache content for transmission to browsers 12 in response to requests 22. Data center 14 responds to request 22 from browser 12 by providing the requested web page or other data to browser 12 using network 13. Data centers 14 are described in more detail in association with FIG. 3. In the disclosed embodiment, data centers 14 cache content from origin server 18. Data centers 14 provide current, cached content originally available from origin server 18 to a browser 12 in response to request 22. In the disclosed embodiment, data centers 14 are shown as communicating with a single exemplary origin server 18, however, data centers 14 are operable to communicate with and provide service to a plurality of origin servers 18.

Caching content comprises storing a copy of content available at or generated by origin server 18. Content is initially generated at origin server 18 and a copy is stored ("cached") at data centers 14. The copy is retrieved by a particular data center 14, such as data center 14A, in response to receiving a particular request 22 requesting particular content. If that particular content is not available at data center 14A, then that particular content is retrieved from origin server 18. The caching process is described in more detail in association with FIG. 5. A copy of the content available from origin server 18 may be stored at one particular data center 14, a plurality of the data centers 14 or all of the data centers 14 depending on which data centers 14 receive requests 22 for that content.

As discussed previously, some content may be dynamic in the sense that it may become inaccurate or superceded over time. To address this situation, content currently existing at the data centers 14 may be marked as expired in response to an expiration command 24 (discussed in detail in association with FIG. 5) from data center manager 16. Content may alternatively be actively deleted in response to expiration command 24. Expired content is considered locally unavailable at data centers 14 by data centers 14 and is retrieved from origin server 18 in response to a new request 22 for the particular content.

Caching content at data centers 14 decreases the number of requests 22 that must be serviced by origin server 18. In the disclosed embodiment, since data centers 14 will request content from origin server 18 only when the content is locally unavailable at data center 14, origin server 18 will be required to generate or provide a particular content item a maximum number of times. Typically, the maximum number of content generation occurrences equals the total number of data centers; however, the number of content generation occurrences may exceed the total number of data centers. For example, if data centers are used, then the origin server will only have to generate a particular content item at most 10 times, once for each data center, because after the particular content item is generated for each data center 14, the data centers 14 will provide the particular content item to browser 12 instead of origin server 18 providing the content item to browser 12. By spreading requests 22 over a plurality of data centers 14, response time is decreased because the processing load associated with servicing the requests is spread over multiple computers at multiple locations. Also, in the disclosed embodiment, data centers 14 are located closer, in terms of network distance, to clients 11. Network distance is described in more detail in association with FIG. 2. For example, data center 14A is closer to client 11A, data center 14B is closer to client 11B, and data center 14C is closer to client 11C. However, any data center 14A-C may service requests from browser 12 on any client 11A-C. Locating data centers 14 closer to clients 11 decreases the response time for handling requests by decreasing the amount of time that the response and the request spends in transit over network 13 from a particular data center 14 to a particular client 11.

Data center manager 16 is coupled to data source 20 and data centers 14. Data center manager 16 operates to expire content at data centers 14. In the disclosed embodiment, data center manager 16 comprises a computer system executing software which is operable to expire content at data centers 14. Data center manager 16 expires content at data centers 14 by sending data expiration commands 24 to data centers 14. Data center manager 16 may generate data expiration command 24, for example, in response to a change in the content at data source 20. Specifically, data center manager 16 generates data expiration command 24 in response to a data change message 28 (discussed in more detail in association with FIG. 5) from data source 20. Data center manager 16 may also generate data expiration command 24 in response to the elapsing of a predetermined time period. For example, data center 16 may know that certain content changes at periodic intervals at data source 20 and independently generates a data expiration command 24 for that content.

Data source 20 stores data used for generating content and content itself. Data source 20 comprises magnetic storage devices, optical storage devices, persistent storage devices, transient storage devices, and any other suitable storage device or technology for storing data. Data source 20 may be a portion of origin server 18 or may be physically separate therefrom. Data source 20 includes a trigger portion 21. Trigger portion 21 of data source 20 generates data change message 28 indicating changes in the content or portions of content available from origin server 18 and stored in data source 20. Trigger portion 21 may also indicate a change in the data based on the time and date. Data change message 28 is then communicated to data center manager 16.

Origin server 18 is coupled to data centers 14 and data source 20. Origin server 18 comprises software executing on a computer for receiving and responding to requests 22. Origin server 18 may comprise a single computer executing software or may comprise a plurality of computers each executing software. In the disclosed embodiment, origin server 18 is associated with a single Internet domain; however, multiple origin servers 18 associated with multiple distinct Internet domains are also usable in connection with the present invention. Also, in the disclosed embodiment, origin server 18 is a hypertext transport protocol (HTTP) server which is also known as a web server. Origin server 18 may additionally support other protocols such as the file transfer protocol (FTP) and the gopher protocol. Origin server 18 retrieves information from data source 20 in response to requests 22 forwarded from data centers 14. Origin server 18 is operable to retrieve static content, such as prewritten text files, images, and web pages, from data source 20 in response to requests 22. Origin server 18 is also operable to generate new, dynamic content, for example, by dynamically creating web pages based on content stored in data source 20 in response to requests 22. For example, origin server 18 may generate a new web page using a common gateway interface (CGI) script, generate a new web page from the result of a structured query language (SQL) request and perform other suitable content generation functions. Origin server 18 may also be operable to generate executable software, such as applications and applets, in response to requests for data. For example, origin server 18 may generate a Java applet in response to an appropriate request 22.

DNS server 23 comprises any suitable DNS server for translating machine and domain names into numeric Internet Protocol (IP) addresses. DNS server 23 may also comprise a single DNS server or multiple DNS servers; however, DNS server 23 is discussed as if it were a single DNS server. In order for origin server 18 to be served by data centers 14, DNS server 23 resolves machine and domain names associated with origin server 18 to data centers 14. Specifically, all or a portion of the domain names and machine names associated with origin server 18 are translated to IP addresses associated with data centers 14. Requests 22 directed to origin server 18 will now be received by data centers 14 from browsers 12 before requests 22 reach origin server 18. Specifically, requests 22 directed to domain names and machine names associated with origin server 18 resolve to IP addresses data centers 14. Any subset of the domain names and machine names in any suitable combination may be redirected to data centers 14. The subset can be changed by the administrator associated with origin server 18 at any time so as to provide flexibility as to whether content at origin server 18 is cached. Data centers 14 can then control the flow of requests 22 between browsers 12 and origin server 18.

In operation, browsers 12 generate requests 22 for content from origin server 18. One of the data centers 14 receives request 22. Data centers 14 receive request 22 even though request 22 is directed at origin server 18 because DNS resolution has directed request 22 to data center 14. Stated another way, requests 22 addressed to origin server 18 are routed to data centers 14. For example, if browser 12 on client 11A generates request 22, then data center 14A receives request 22 before request 22 reaches origin server 18. Specifically, request 22 has an associated address portion indicating the destination web site for request 22. Since DNS server 23 resolves one of data centers 14 as the destination instead of origin server 18, data centers 14 can receive request 22 by resolving the address portion of request 22 to the address of the closest, in network distance, data center 14 to browser 12 using DNS server 23.

Continuing the above example, data center 14A then determines whether the requested content has been cached at data center 14A. If the requested content is cached at data center 14A, then request 22 is handled at data center 14A and the requested content is returned to browser 12. If the requested content is not available at data center 14A, request 22 is forwarded to origin server 18 for handling. When origin server 18 is required to handle request 22, the requested content will first be communicated to data center 14A for caching, if the requested content is to be cached, and then transmitted from data center 14A to browser 12 on client 11A.

Figure 2:
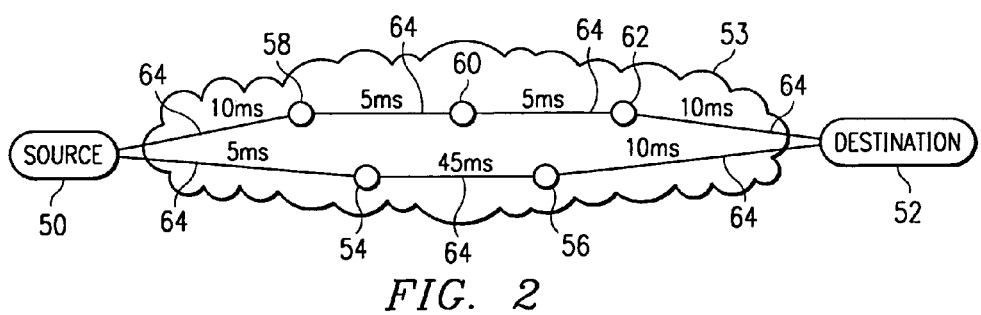
FIG. 2 is an exemplary network illustrating network distance between a source node and a destination node.

FIG. 2 is an exemplary network illustrating network distance between a source node 50 and a destination node 52 in a packet switched network. Source node 50 comprises any suitable network device, such as a computer, operable to generate a data packet for communication to destination node 52. Destination node 52 comprises any suitable network device for receiving data packets from source node 50, such as a computer. Between source and destination nodes 50 and 52 is a communication network 53 such as the Internet. Communications network 53 comprises a plurality of nodes 54, 56, 58, 60, and 62. Each node 54, 56, 58, 60 and 62 comprises any suitable network device for receiving data packets and transmitting data packets, such as a computer or router. Each of the nodes 50, 52, 54, 56, 58, 60 and 62 are coupled by communications links 64. Each of the communications links 64 has a latency associated therewith. The latency represents the sum of the time a packet has spent waiting to be forwarded out of a particular node and the transit time over the link, for convenience, the latency is associated with a particular link, even though a majority of the latency time will typically be spent by the packet while waiting to be forwarded out of the node. The latency is indicated by a time in milliseconds. For example, communications link 64 between nodes 54 and 56 has a latency of 45 milliseconds.

Distance between the source and destination 50 and 52 may be determined in various ways. In the exemplary configuration of FIG. 2, only hop count and latency between the source and destination 50 and 52 are considered, however, other measures of network distance are also usable. The distance between the source and destination 50 and 52 may be determined by counting the number of nodes between the source node 50 and the destination node 52 ("hop count"). For example, the distance from source node 50 to destination 52 is three hops along the path defined by nodes 54 and 56 and is four hops along the path defined by nodes 58, 60 and 62. Each hop represents one communication link 64 that a packet traverses. Thus, from source node 50 to node 54 is one hop, from node 54 to 56 is another hop, and from node 56 to destination node 52 is another hop.

The latency of communications links 64 may also be considered in determining network distance. For example, a packet traveling from source node 50 to node 54 will take five milliseconds to travel across the communications link 64 between source node 50 and node 54. Similarly, a data packet traveling from source node 50 to node 58 will experience a ten millisecond delay as the packet crosses communications link 64 between source node 50 and node 58. The total latency experienced by a data packet traveling from source node 50 to destination node 52 is the sum of the latencies of each communication link 64 traversed on the path from source node 50 to destination node 52. Thus, the latency from source node 50 to destination node 52 along the path defined by nodes 54 and 56 is sixty milliseconds (5 milliseconds+45 milliseconds+10 milliseconds). The total latency between source node 50 and destination node 52 along the path defined by nodes 58, 60 and 62 is thirty milliseconds (10 milliseconds+5 milliseconds+5 milliseconds+10 milliseconds). Thus, while the number of hops between source node 50 and destination node 52 through nodes 54 and 56 includes fewer hops, the latency is much higher than along the path of nodes 58, 60 and 62. By considering both the number of hops and the latency, the distance between the source node 50 and destination 52 may be determined and the faster and shorter route can be chosen. Also, the latency of any particular communications link 64 may not be a fixed value. For example, the link 64 between nodes 54 and 56 is shown as 45 milliseconds which may result when a large amount of data is being communicated between nodes 54 and 56. As the amount of network traffic between 54 and 56 decreases, the latency may decrease as well. Thus, while in the exemplary network of FIG. 2, the path across nodes 58, 60 and 62 has a lower latency than the path along nodes 54 and 56, at some other time the path along nodes 54 and 56 may be more optimal than the path along nodes 58, 60 and 62. The determination of network distance discussed above is also applicable to determining which of a plurality of destination nodes has the shortest path from a single source node.

Figure 3:
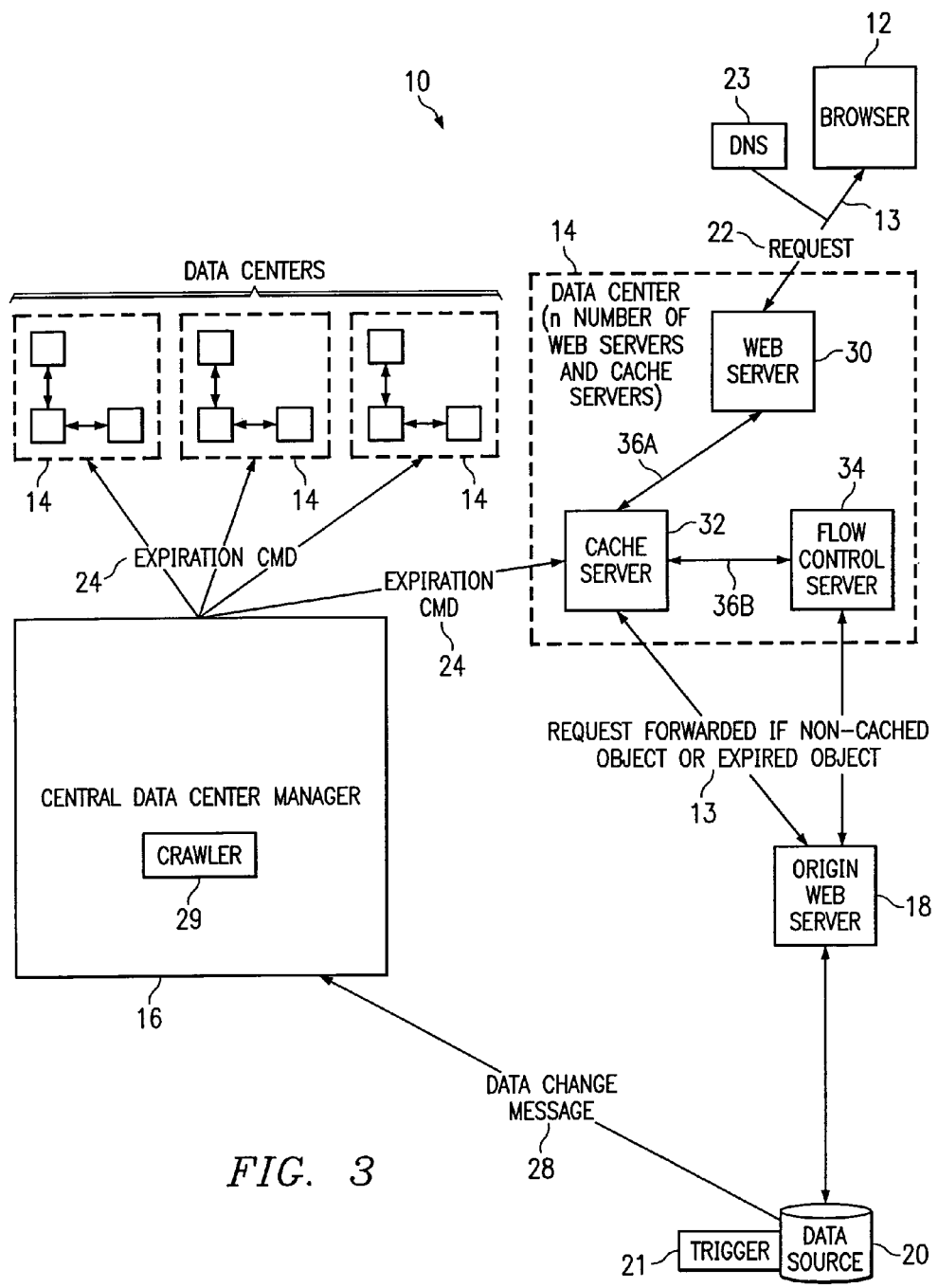
FIG. 3 is block diagram illustrating details of the web content caching system of FIG. 1.

FIG. 3 is block diagram illustrating details of web caching system 10. Data center manager 16 comprises a crawler application 29. Crawler application 29 comprises a software application executed by data center manager 16 for assisting an administrator associated with origin server 18 in determining which content available from origin server 18 should be cached at data centers 14, status information (described later in association with flow control server 34 and in detail in association with FIG. 4) associated with particular content items, priority information (described in later in association with flow control server 34 and in detail in association with FIG. 4) associated with requests, such as requests 22 and other suitable configuration information associated with controlling the caching of content from origin server 18. Data center 14 comprises a web server 30, a cache server 32, a flow control server 34 and communication links 36A and 36B. Web server 30 is coupled to communications network 13 and is operable to receive request 22 and generate responses thereto. Web server 30 is further coupled to cache server 32 over communication link 36A. Cache server 32 is coupled to flow control server 34 over communication link 36B and to origin server 18 over network 13. Cache server 32 is operable to store content requested from web server 30 and provide requested content to web server 30. Flow control server 34 is operable to control cache server 32 by determining when cache server 32 may request content from origin server 18.

Web server 30 comprises any suitable server application operable to retrieve data in response to requests 22. In the disclosed embodiment, web server 30 comprises an HTTP server ("web server"), such as the Internet Information Server® by Microsoft Corp. of Redmond, Wash. and the Apache web server by the Apache Software Foundation of Forest Hill, Md. Web server 30 receives request 22 and examines request 22 to determine what content is requested by request 22. Web server 30 then requests the desired content from cache server 32. Alternatively, web server 30 may only determine whether the requesting user is allowed access to the requested content, decrypt Secure Socket Layer (SSL) encrypted content requests and then pass the request over to cache server 32 for handling. After receiving the requested content from cache server 32, web server 30 provides the requested content to browser 12.

Figure 5:
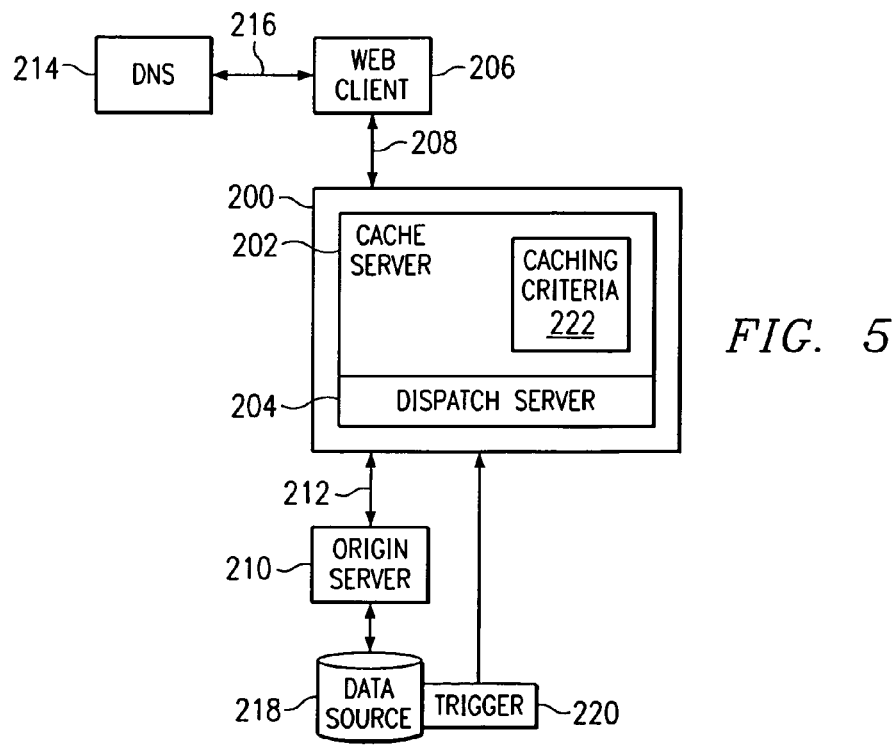
FIG. 5 is a block diagram illustrating details of a cache server system usable with the present invention.

One example of a cache server that could be used as cache server 32 is shown in FIG. 5. Cache server 32 comprises a software program executing on a data processing system for storing and retrieving content in response to information requests from web browser 12. For example, cache server 32 may comprise the Squid caching application. Specifically, cache server 32 operates to store content, such as web pages, previously requested by browser 12.

In operation, cache server 32 provides transparent proxy, content caching, content synchronization, flow control and status response functionality. Transparent proxy functionality comprises passing content and requests through cache server 32 and not altering the content or the request as seen by browser 12, origin server 18 or web server 30. Both browser 12 and origin servers 18 are typically unaware of the proxy server. Content caching comprises storing, at cache server 32, cacheable content that is served to browsers 12 by the proxy server functionality of cache server 32. The cached content may later be served to additional browsers 12 without going back to origin server 18. Cacheable content may be indicated by a set of headers associated with the content from origin server 18 and by the configuration of cache server 32. Cacheable content also comprises HTTP POST requests. One element of the configuration of cache server 32 may specify that caching instructions in the headers of the content may be ignored. Content synchronization comprises preloading and expiring content stored at cache server 32. Flow control allows for each incoming content request to be subjected to a scoring mechanism that indicates the priority of the content request.

In the disclosed embodiment, a substantial portion of the content on cache server 32 will have been originally retrieved from origin server 18. Substantially little of the information available on cache server 32 is independently generated by cache server 32. Alternatively, cache server 32 may generate all or any portion of the content available on cache server 32. Cache server 32 and web server 30 may optionally have their functionality combined into a single element such that cache server 32 provides suitable functionality to allow cache server 32 and flow control server 34 to handle requests 22 as described previously without the use of a discrete web server 30.

In operation, crawler 29 examines all or a portion of the web pages available at origin server 18. Crawler 29 generally communicates directly with web server 18 using the HTTP and HTTP Secure (HTTPS) protocols. Crawler 29 then hierarchically organizes the web pages for an administrator associated with origin server 18 (not shown) so that the administrator may determine which web pages should be cached at data centers 14. Crawler 29 also allows the administrator to configure status information and alternate content associated with particular content items, priority information associated with requests 22 and other suitable configuration information associated with controlling the caching of content from origin server 18. The configuration information provided by the administrator using crawler 29 is used to configure and control data centers 14. Crawler 29 may alternatively determine automatically which web pages available at origin server 18 should be cached at data centers 14. When crawler 29 requires access to SSL secured web pages at origin server 18, crawler 29 communicates with origin server 18 through a crawler web server (not shown) similar to web server 32. The crawler web server is used to provide an SSL secured link between origin server 18 and crawler 29. The crawler web server appropriately encrypts and decrypts communications with origin server 18 while communicating using unencrypted communications with crawler 29.

Cache server 32 receives a request for information, such as request 22, from web server 30. Cache server 32 then examines request 22 and determines whether the requested content is locally available and current on cache server 32. If the requested content is locally available and current on cache server 32, cache server 32 communicates the requested content to web server 30 over link 36A for communication back to browser 12. If the requested content is not available on cache server 32, cache server 32 communicates request 22 to origin server 18 under the control of flow control server 34 as described below. After requesting content, cache server 32 receives the requested content from origin server 18. Cache server 32 then determines whether the retrieved content is cacheable. If the content is cacheable, then cache server 32 stores a copy of the content and then communicates the content to web server 30 for communication to browser 12. If the content is not cacheable, then cache server 32 does not store a copy of the information and passes the information to web server 30 for communication to browser 12. Cache server 32 determines whether content is cacheable based on configurable cache criteria (described in more detail in association with FIG. 5). Cache server 32 is further operable to preload one or more content items. For example, cache server 32 may be configured by an administrator associated with origin server 18 to preload content items that the administrator knows will be accessed in order to further decrease the load at origin server 18.

Cache sever 32 determines whether content is locally available and current based on at least two criteria. The first criteria is whether the requested content is present at cache server 32. If the requested content is present at cache server 32, the second criteria is whether the requested content is current or expired. Each content item stored at cache server 32 may have a respective expiration time associated therewith. Since some content may never expire, or may not have an expiration time known ahead of time, any particular content item may or may not currently have a respective expiration time associated therewith. The expiration time describes when the content item expires and is no longer valid. The expiration time is updateable and may be initially set as a function of the content item such as the expiration time used by the HTTP protocol. In the disclosed embodiment, the expiration time comprises a time and date indicating when the associated content item expires, such as with an offset indicating an amount of time that must elapse before the content item is expired. The expiration time may alternatively comprise any suitable representation for representing when a content item expires. The expiration time may be accelerated, decelerated or otherwise changed by an expiration command 24.

Expiration command 24 is generated by data center manager 16 and indicates a change in the expiration time associated with one or more items of content on cache server 32. In the disclosed embodiment, expiration command 24 comprises an Internet Cache Synchronization Protocol (ICSP) terse command (described in detail in association with FIG. 4).

Expiration command 24 is generated by data center manager 16 in response to data change message 28 from data source 20. Data change message 28 is generated by trigger 21 associated with data source 20. Trigger 21 detects a change in one or more content items available from data source 20. Trigger 21 then generates data change message 28 indicating which content items have changed and communicates data change message 28 to data center manager 16. Data center manager 16 then generates one or more expiration commands 24 to expire the cached copies of the changed content items at one or more data centers 14. For example, if an airline flight schedule has changed at data source 20, then the airline would not want customers receiving invalid flight schedules from data centers 14. Therefore, trigger 21 detects the change and communicates the change to data center manager 16. Data center manager 16 then informs data centers 14 of the change so that when a request for the flight schedule arrives at one or more data centers 14, data centers 14 will know to request a new copy of the flight schedule from origin server 18 associated with data source 20. In the disclosed embodiment, data centers 14 and specifically cache server 32, do not request a new copy of expired content except in response to a request 22 for that content. Alternatively, cache server 32 could actively request a new copy of the changed content in response to receiving expiration command 24. Note that since cache server 32 does not request a new copy of changed content in response to expiration command 24, it is possible and expected that cache server 32 may receive multiple expiration commands 24 expiring the same content. When multiple expiration commands 24 are received by cache server 32 which each expire the same or overlapping content, cache server 32 may repeatedly mark the expired content as expired, but will retrieve new content only in response to an appropriate request 22. By not updating the expired content after each expiration command 24, cache server 32 decreases the network and processing load on origin server 18 by not requesting content that browsers 12 may not request for a long period of time or before the next expiration command 24 expiring that content. This provides a significant decrease in the processing and network load experienced by origin server 18 by avoiding retrieval of unused and yet to be requested content by cache server 32.

Figure 4:
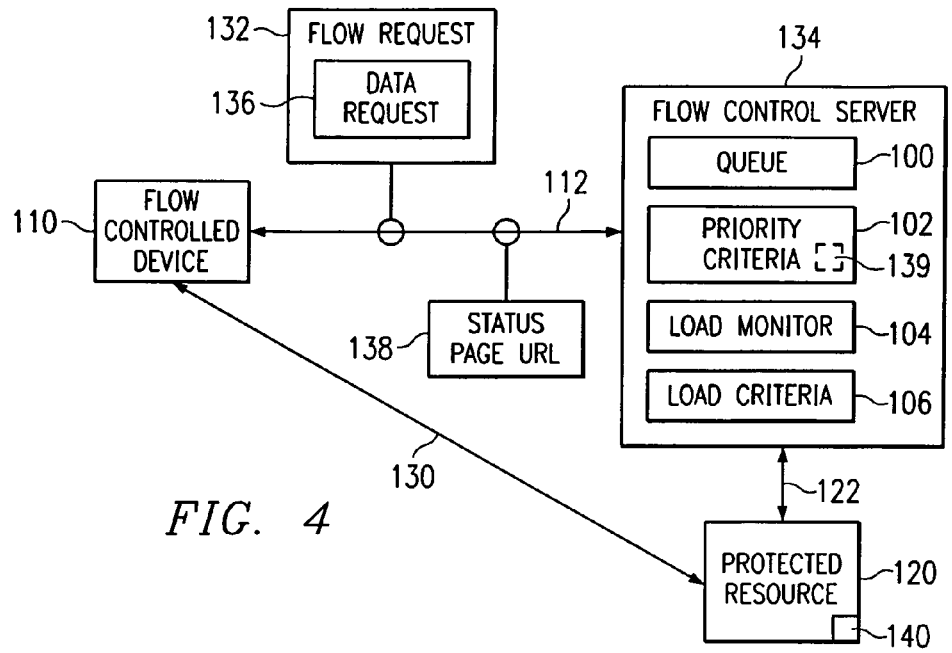
FIG. 4 is a block diagram illustrating details of a flow control server usable with the present invention.

One example of a flow control server that could be used as flow control server 34 is described in association with FIG. 4. Flow control server 34 is operable to control and regulate the passing of information requests, such as requests 22, from cache server 32 to origin server 18. Flow control server 34 operates to monitor the processing and network load on origin server 18. Cache server 32 requests permission from flow control server 34 to request locally unavailable content from origin server 18. Flow control server 34 determines whether cache server 32 may request content from origin server 18 based on the processing and network load on origin server 18.

In addition to controlling whether cache server 32 can request locally unavailable content from origin server 18, flow control server 34 is operable to determine the order in which requests for locally unavailable content are communicated from cache server 32 to origin server 18. Flow control server 34 may order the requests for locally unavailable content as a function of various load criteria (described in detail in association with FIG. 6) configured by an administrator associated with origin server 18, such as a current state associated with each request. For example, cache server 32 requests permission to forward two requests to origin server 18, the first request is a search request for product information by a first user and the second request is a request from a second user to buy a product from an electronic commerce site. Flow control server 34 can prioritize and order the first and second requests so that the second request is handled first, because the administrator has indicated that buy requests should get immediate handling so that the user does not get impatient and abort the order while search requests which are less important are occupying the server. Additionally, flow control server 34 could order the first and second requests based on information associated with the first and second users, such as the buying history or amount of money previously spent by the first and second users. Flow control server 34 evaluates the processing and network load on origin server 18 according to user-specified criteria to determine if cache server 32 may request content from origin server 18. For example, the user may specify that origin server 18 should not exceed 90% of its maximum processing capability. For another example, the maximum number of simultaneous connections may be limited to some number, such as 5,000. For yet another example, flow control server 34 may periodically interrogate origin server 18 to determine the current load and the criteria may specify the maximum allowable load on origin server 18 as a function of the response of origin server 18 to the interrogation, such as how long origin server 18 take to return a requested web page.

When flow control server 34 does not allow cache server 32 to request content from origin server 18, cache server 32 may be instructed to return status information to web server 30. Status information comprises information alerting browser 12 that processing of request 22 is in process, but will be delayed. For example, status information may describe the length of time before request 22 will be processed. The status information may also list the position of request 22 in a queue of requests to be processed. The status information may also present an advertisement to a user of browser 12. For example, the advertisement may be generated based on information previously gathered about the user associated with browser 12. Generally, the status information may configurably provide any suitable information to the user associated with browser 12 as determined by the administrator associated with origin server 18 and configured into the load criteria for origin server 18. In the disclosed embodiment, the status information comprises an HTML web page generated based on load criteria determined by the administrator associated with origin server 18.

Data links 36A and 36B comprise the data communication portion of data center 14 and support communication between web server 30, cache server 32 and control server 34. Data links 36A-B may comprise any suitable wireless and wireline computer. networks. Data links 36A-B may also comprise a computer bus and any other suitable combination of hardware and software operable to support communication between web server 30, cache server 32 and flow control server 34. When two or more of web server 30, cache server 32, and flow control 34 are executing on a single physical computer, then data links 36A-B comprise data communication systems for communicating between programs and within programs executing on a single physical device. For example, if web server 30 and cache server 32 are both being executed by the same physical computer, then data link 36A may comprise a peripheral component interface (PCI) bus for transferring data between web server 30 and cache server 32. For another example, when web server 30 and cache server 32 are executing on separate physical devices, then data link 36A may comprise an Ethernet network. Data links 36A-B may represent two distinct data communication systems, portions of a single data communications system, or any suitable combination thereof. For example, data link 36A may comprise an Ethernet network while data link 36B represents a computer bus.

FIG. 4 is a block diagram illustrating details of a flow control server 134. FIG. 4 illustrates a general flow control server for increased clarity and the application of the general flow control server to flow control server 34 will be shown. Flow control server 134 operates to regulate and control the flow of data requests from a network device which desires data and a network device having the data. Flow control server 134 comprises one or more queues 100, one or more sets of priority criteria 102, one or more load monitors 104 and one or more sets of load criteria 106. Flow control server 134 is coupled to a flow controlled device 110 over a communications link 112 and to a protected resource 120 over communications link 122. Flow controlled device 110 and protected resource 120 communicate over communications link 130.

Queue 100 comprises a computer readable memory of any suitable type, such as random access memory, magnetic memory and optical memory. Queue 100 stores a plurality of data requests 136.

Priority criteria 102 comprises information provided by an administrator (not shown) associated with protected resource 120 to server 134 for determining the relative importance of requests for data from device 110 to resource 120. Priority criteria 102 may specify that specific types and groups of requests be given specific priority levels while other requests be given a default priority. For example, a product buy request at an e-commerce site or an add to shopping cart request may be given a higher priority, while a request for a product catalog may be given a lower priority or a default priority. For another example, a higher priority may be given to requests originating from a particular IP address because empirical data suggests that that IP address has a high probability of buying. For yet another example, priority criteria 102 may track purchasing patterns at an e-commerce site and determine that certain products have a higher probability of actually being purchased after being added to a shopping cart. Also, priority criteria 102 may be updated dynamically. For example, if a particular product suddenly becomes a popular item, priority criteria 102 can automatically adjust to the increased popularity of the item and assign a higher priority to requests related to that item.

Load monitor 104 comprises an application program for monitoring and determining the current processing load experienced by resource 120. Load criteria 106 comprises information provided by the administrator associated with resource 120 to server 134 for determining the maximum load server 134 should allow resource 120 to experience. For example, load criteria 106 may specify that resource 120 should experience no more than 10,000 simultaneous connections. For another example, load criteria 106 may specify that resource 120 not be loaded beyond 90% of the resource's processing capability. Also, load criteria 106 may specify the maximum allowable load as a function of the response of server 120 to interrogation by server 134.

Communications links 112, 122 and 130 may comprise any suitable data communication system operable to support communication between device 110, server 134 and resource 120. In the disclosed embodiment, links 122 and 130 each comprise a portion of the Internet and link 112 comprises an Ethernet link.

In operation, flow controlled device 110 desires to retrieve data from protected resource 120. Before retrieving data from protected resource 120, flow controlled device 110 requests permission to retrieve data from flow control server 134 by sending a flow request 132 over link 112. Flow request 132 includes data request 136 that device 110 wishes to send to resource 120. Specifically, device 110 will generate flow request 132 with data request 134 therein.

Flow control server 134 receives flow request 132 and determines whether to grant or deny permission to device 110 to request data from resource 120. Flow control server 134 then determines the current processing load at resource 120 and determines if the current processing load at resource 120 exceeds load criteria 106 for resource 120.

When the current processing load at resource 120 is below load criteria 106, then server 134 grants permission to device 110 and device 110 retrieves the desired data from resource 120. When the current processing load at resource 120 exceeds load criteria 106, server 134 may deny permission to device 110 to retrieve the desired data from resource 120.

Load monitor 104 communicates with resource 120 over link 122 to maintain current load information about resource 120. Any suitable load metric and combinations of load metrics for representing the current resource and processing load on resource 120 may be used. For example, the number of simultaneous connections currently being supported by resource 120 may be monitored. For another example, load monitor 104 may interrogate resource 120 to determine the current load, such as by retrieving one or more Uniform Resource Locators (URLs) from resource 120 and observing the response of resource 120. For yet another example, resource 120 may further comprise a monitoring application 140 for collecting suitable load information about resource 120 and communicating the load information to load monitor 104 over link 122. For example, application 140 may monitor the CPU load on resource 120.

Server 134 then associates a priority value with data request 136 based on priority criteria 102 associated with resource 120. In the disclosed embodiment, the priority value comprises an integer value between 1 and 10, but may comprise any suitable value having order. Server 134 then stores the prioritized data request 136 in queue 100 based on the priority value. Server 134 then removes the highest priority request currently in queue 100 and returns this request to device 110 with permission to send this request to resource 120 and retrieve the associated data when resources at resource 120 are available to process the request.

When prioritized request 136 is inserted into queue 100, prioritized request 136 is inserted into queue 100 based on the associated priority value. Specifically, queue 100 is sorted first on the priority value associated with each request in queue 100. Prioritized requests with equal priority values are ordered in a first-in, first-out order. Alternatively, other suitable arrangements for ordering prioritized requests in queue 100 may be used.

In addition, when server 134 denies permission to device 110 to retrieve information from resource 120, server 134 may specify that device 110 return a status page 138 or other alternate content to an associated user (not shown) who generated request 136 based on priority criteria 102. Status page 138 comprises any suitable alternate content returned as a function of priority criteria 102 and load criteria 104. In the disclosed embodiment, status page 138 comprises an HTML page. Specifically, server 134 provides a Uniform Resource Locator (URL) to device 110 which specifies the web page device 110 should retrieve as status page 138 in place of the web page requested by data request 136. For example, status page 138 may comprise a web page dynamically generated by a web server other than resource 120 based on the URL provided by server 134. Typically, the specified status page 138 will include an automatic resubmission time, such as ten seconds, for re-issuing request 136. Alternatively, any suitable type of alternate content may be returned to the associated user instead of the content requested by request 136. One advantage of returning status page 138, instead of simply waiting for a timeout or returning "server too busy", to the user is that the user can receive a more useful and user-friendly response than "server too busy." Also, when a "server too busy" response is returned, in traditional systems, the original request is lost. Device 110 would then need to resubmit the request to have the request processed. If the request was to buy an item, and device 110 does not resubmit the request, the sale would be lost. In contrast, server 134 stores the request for later processing and the sale would not be lost. Also, by allowing the HTTP connection to close after receiving the status page, resources at both the client requesting the content and any servers which the client has contacted are released for other uses.

Priority criteria 102 may also specify temporary alternate content, such as status page 138, or replace the requested content with replacement alternate content 139 based on the communication bandwidth available to the user who generated request 136. Specifically, priority criteria 102 may specify temporary alternate content, such as status page 138, or replacement alternate content 139 for a particular request 136 for each of a high-bandwidth connection, a medium-bandwidth connection and a low-bandwidth connection. The definition of high, medium and low are configurable by an administrator associated with resource 120. For example, the administrator of a streaming media web site may define "high" bandwidth differently from the administrator of a text-based news site. For example, in the disclosed embodiment, request 136 may request http://www.domain.com/stuff.jpg and priority criteria 102 may return stuff1.jpg for a low-bandwidth connection, stuff2.jpg for a medium-bandwidth connection and stuff3.jpg for a high-bandwidth connection as replacement alternate content 139. For another example, in operation, request 136 is queued in queue 100 by flow control server 134 and the appropriate status page 138 is returned. Continuing the example, request 136 is then released from queue 100 and priority criteria 102 is used to determine that request 136 should have high-bandwidth alternate content 139 returned instead of the content requested by request 136. Stated another way, status pages 138 and alternate content 139 are not mutually exclusive since request 136 could have a particular status page 138 returned and then have alternate content 139 returned instead of the requested content. Further, either, both or neither of the particular status page 138 and alternate content 139 may be determined based on the bandwidth available to the user who originated request 136. Alternatively, a larger or smaller set of connection types may be defined by priority criteria 102. For example, a administrator associated with resource 120 could specify five different types of connections based on differing amounts of available bandwidth.

Status page 138 may also be delayed before being retrieved. If the originally requested content becomes available before the delivery of status page 138, then the originally requested content will be returned instead of status page 138. For example, an administrator associated with resource 120 may know that a 1 second delay is common for resource 120 and specify that status page 138 not be delivered for 1.5 seconds to account for the expected 1 second delay. The administrator can use the delay functionality to control the return of status pages 138 only when resource 120 is experiencing delays longer than an expected delay.

An example illustrating status page 138 and flow control server 134 is provided for increased clarity. Device 110 generates data request 136 in response to a desire for content from a user associated with device 110. Device 110 then generates flow request 132, includes data request 136 therein, and sends flow request 132 to server 134. Server 134 determines the current load on resource 120 and, for the purposes of this example, determines that resource 120 is currently too heavily loaded to currently handle request 136. Thus, server 134 prioritizes request 136 and stores request 136 in queue 100. Server 134 also consults priority criteria 102 for resource 120 and determines that status page 138 should be sent to the user. Priority criteria 102 for resource 120 specifies that a URL for a web page that will list the position in queue 100 of request 136 and be automatically re-submitted in ten seconds should be returned, such as: http://www.domain.com/status_page.asp?queue_position=10&resubmit=10. Server 134 then responds to flow request 132 and informs device 110 to retrieve the URL. Device 110 then retrieves status page 138. Note that flow control server 134 may have knowledge of the expected time until resource 120 handles the request and may set the automatic resubmission time to be slightly longer than the time resource 120 will take to process request 136. Specifically, server 134 knows that resource 120 will take 9 seconds to process request 136 so server 134 sets the automatic resubmission time to 10 seconds so that when request 136 is re-submitted to resource 120, the response is already available and the user sees a very fast response time.

In an alternative embodiment, the functionality of flow control server 134 is used to provide content filtering. In this embodiment, protected resource 120 comprises the Internet and flow controlled device 110 comprises a computer attempting to access the Internet. Load criteria 106 specifies that all or substantially all data requests 136 should be stored in queue 100 before being passed to the Internet. Priority criteria 102 specifies that status pages 138 should be sent based on the type of data requested by data request 136. Specifically, priority criteria 102 specifies that status page 138 should be returned when data request 136 requests restricted or illegal data. For example, in a country where certain types of data, such as images involving nudity, are illegal, priority criteria 102 may specify that a "Materials Illegal" status page 138 be returned when illegal data is requested and that the queued request 136 for illegal data be discarded without being passed on to the Internet. For another example, priority criteria 102 may specify a legal version of the requested illegal data that is to be returned instead of the illegal data. Priority criteria 102 may evaluate whether the requested data is illegal data based on the geographic origin of request 136, external information associated with a user who generated request 136, the data requested by request 136 and any other suitable criteria.

In the disclosed embodiment of FIGS. 1 and 3, device 110 comprises cache server 32, server 134 comprises server 34, resource 120 comprises origin server 18 and data request 136 comprises request 22. Also in the disclosed embodiment, the Flow Control Protocol (FCP) (described below) is used to support the flow control functionality described above, such as flow request 132.

The Flow Control Protocol (FCP) is used to exchange messages between the flow controlled device and the flow control server. The FCP may also be used for communication among any number of flow control servers 134. The FCP is described here in terms of the World Wide Web (WWW), but could be used in any suitable environment for controlling data flow between a flow controlled device and a protected resource.

FCP Overview

When a flow controlled device receives a request, it sends an initial request message to the flow control server to gain permission to send the request to the origin server. The flow control server responds with an initial response message. This message indicates go (send) or no go (do not send). If the response is go, the flow controlled device is allowed to send the request to the protected resource.

If the message indicates no go, the flow controlled device must wait until the flow control server sends it a request to send message. This messages gives the flow controlled device permission to send the request to the protected resource.

The flow controlled device responds to the subsequent request by returning a response status message to the flow control server indicating how many requests were received, how many were processed, or if an error occurred.

In the event that a flow controlled device quits and another flow controlled device receives the request ID intended for the original device, the new device must send an ownership transfer message to the flow control server so it can "own" the request. The flow control server responds to the flow controlled device with an ownership assignment message. If the flow control server has no record of the request, it must broadcast an ownership query message to the remaining flow control servers to see if the request resides on any of them. The flow control servers return an ownership query response message indicating the request.

Initial Request Message

When a flow controlled device receives a request from a browser, it sends an initial request message to the flow control server to gain permission to send the request to the origin server. The initial request message uses the following syntax:
[xxxx] [xxxxxxxxxxxxxxxxxxxxxx] Request

TABLE 1

| Field | Meaning |
|---|---|
| xxxx | The length of the entire message. The maximum length of the message is 4127 bytes, which is composed of a maximum message length of 4092, plus the length and ID fields. Valid integers for the length are 0032 - 4127. If the length is fewer than four digits, use zeros for padding. |
| xxxxxxxxxxxxxxxxxxxxxx | The Globally Unique Identifier (GUID). This identifier is uniquely associated with the request. Each x represents a character. The GUID length is 22 characters. |
| Request | The entire http request. The request cannot be more than 4096 bytes (4K). |

An example of an initial request is shown below. The request portion is only intended as a representation and is not a full request.
[L0077]    [127.000.000.001-0fb450]GET/http://xfiles.domain.com/test/d.html
Note: There are no spaces between the brackets.

Initial Response Message

The flow control server bases its response to the device upon various criteria, such as the load on the origin server. If the number of requests to the protected resource surpasses its designated maximum load, the flow control server will not allow the flow controlled device to send the request. The flow control server sends an initial response message to the flow controlled device using the following syntax (note that "\t" indicates one tab stop between values):
GO\NOGO\tPause\trefresh rate\tstatusURL\n

TABLE 2

| Field | Meaning |
|---|---|
| GO | NOGO | The response is either GO or NOGO. GO indicates the flow controlled device has permission to send the request to the origin server. NOGO indicates that the flow controlled device cannot send the request to the origin server until it receives a subsequent response message with a value of GO. |
| Pause | A whole number indicating the length, in seconds, which to pause before sending a status page to the requesting browser. If the content is available before the time expires, a status page is not sent. Note: The pause value can be zero whether or not there is a status page URL. |
| Refresh | A whole number indicating the length, in seconds, which to wait before resubmitting the GUID to the flow controlled device. Note: The refresh value cannot be zero if there is a status page URL. |
| StatusURL | The URL of the status page to send to the requesting browser. If there is no status page URL, the value can be null. Note: If the value is null, the pause and refresh values must both be zero. |
| \n | Indicates line feed. |

Example initial responses are shown below.
GO\t3\t7\thttp://www.company.com/statuspage.htm\n
This message indicates that the flow controlled device can send the message to the origin server. The pause time of 3 seconds indicates that if the request takes more than 3 seconds to return from the origin server, the flow controlled device is to send the indicated status page to the browser. The status page will resubmit the GUID to the flow controlled device in 7 seconds to check if content is available. If yes, the content is returned. If no, another status page is returned that will resubmit in 7 seconds.

In the example below, the flow controlled device is instructed not to send the request. There are no other values.
NoGo\t0\t0\t\n Request to Send Message If the initial response message is NOGO, the flow control server sends a request to send message when it is ready to give the flow controlled device permission to send the request to the origin server. The flow control server sends the message using the following syntax:
GO?GUID1\nGUID2\nGUID3\n\n Table 3 defines the values in the message syntax.

TABLE 3

| Field | Meaning |
|---|---|
| GO | GO indicates the flow controlled device has permission to send the request to the origin server. |
| 1-n GUIDs | A subsequent request message can contain any number of GUIDs. |
| \n | Indicates line feed. Each GUID must be separated by \n. |
| \n\n | Indicates the end of the message. |

The example below shows a subsequent request message.
GO?127.000.000.001-0fb450\n127.000.000.001-0be390\n127.000.000.001-0da040\n\n Response Status Message When a flow controlled device receives a subsequent response message, it sends a response status message to the flow control server indicating how many requests were received and how many were processed. These numbers should be the same if no errors occurred. If an error occurs, the status message will either indicate an error or the two numbers will not be the same.

Ownership Transfer Message

When a flow controlled device sends a status page URL to a browser, the refresh value in the response message indicates the browser will resubmit the GUID to the device at defined intervals. When the GUID is resubmitted, it assumes that the request lives in the flow controlled device that originally serviced the request.

In cases where the flow controlled device has stopped, the resubmitted GUID will go to another flow controlled device. However, the initial request does not reside on this device, so the flow controlled device is unable to associate the GUID with a request. The new device must gain ownership of the request by sending an ownership transfer message to the flow control server.

Ownership Assignment Message

In response to the ownership transfer message, the flow control server sends the flow controlled device an ownership assignment message. This message indicates the request that is associated with the GUID.

Ownership Query Message

In cases where both the flow controlled device and the flow control server have stopped, the ownership transfer message will reach a flow control server that has no record of the request. The flow control server must broadcast an ownership query message to the remaining flow control servers to determine the request.

Ownership Query Response Message

Flow control servers that receive an ownership query message respond to the requesting server with an ownership query response message. This message notifies the querying flow control server of the request associated with a particular GUID.

FIG. 5 is a block diagram illustrating details of a cache server system 200. FIG. 5 illustrates a general cache server for increased clarity and the application of the general cache server to cache server system 32 will be shown. FIG. 5 is discussed in terms of the Internet Protocol (IP), however, any suitable network protocol, such as ATM, frame relay and others, may be used.

Cache server system 200 comprises a cache server portion 202 and a dispatch server portion 204. Cache server system 200 is coupled to a web client 206 via a communications link 208 and to an origin server 210 via a communications link 212. Web client 206 is coupled to a DNS server 214 via a communications link 216. Origin server 210 is further coupled to a data source 218.

Web client 206 comprises any suitable HTTP client operable to communicate with system 200 over link 208. In the disclosed embodiment, web client 206 comprises a web browser such as Internet Explorer. Origin server 210 comprises software executing on a computer for receiving and responding to one or more data requests, such as requests 22 and requests 136. Origin server 210 may comprise a single computer executing software, a plurality of computers each executing software or may comprise hardware with similar functionality. In the disclosed embodiment, origin server 210 comprises a single computer executing an HTTP server which is remote from cache server system 200. Origin server 210 retrieves information from data source 218 in response to data requests. Similar to origin server 18, origin server 210 is operable to retrieve static content and to generate new, dynamic content. For example, origin server 210 may generate a new web page using a common gateway interface (CGI) script, generate a new web page from the result of a structured query language (SQL) request and perform other suitable content generation functions. Origin server 210 may also be operable to generate, executable software, such as applications and applets, in response to requests for data. For example, origin server 210 may generate a Java applet in response to an appropriate data request.

DNS server 214 comprises any suitable DNS server operable to communicate with client 206 over link 216 and provide DNS resolution services to client 206. Specifically, DNS server 214 translates Internet domain names and machine names into the IP address associated that machine and domain.

Data source 218 comprises magnetic storage devices, optical storage devices, persistent storage devices, transient storage devices, and any other suitable storage device or technology for storing data. For example, data source 218 may be a Relational Database Management System (RDBMS) or an Oracle database. Data source 218 may comprise a portion of origin server 210 or may be physically separate therefrom. Data source 218 includes a trigger portion 220. Trigger portion 220 comprises an application program, applet, software within a database, or other suitable executable software associated with data source 218 and operable to detect a change in the data stored at data source 218. Trigger portion 220 generates data change message 28.

Data change message 28 comprises any suitable message operable to indicate a change in the data or any portion of the data stored at data source 218. In the disclosed embodiment, data change message 28 comprises an Internet Cache Synchronization Protocol (ICSP) verbose message (described below).

Cache server 202 comprises cache criteria 222 and a software program executing on a data processing system for storing and retrieving content in response to information requests from web client 206. Specifically, cache server 202 operates to store content, such as web pages, previously requested by web client 206. In the disclosed embodiment, a substantial portion of the content on cache server 202 will have been originally retrieved from origin server 210. Substantially little of the information available on cache server 202 is independently generated by cache server 202. Alternatively, cache server 202 may generate all or any portion of the content available on cache server 202.

Cache criteria 222 comprises criteria provided by an administrator associated origin server 210 for determining which content available from origin server 210 should be cached. Cache criteria 222 may comprise any suitable criteria used to allow cache server 202 to determine whether content should be cached. In the disclosed embodiment, cache criteria 222 comprises one or more URLs specifying web pages that should be cached and web pages that should not be cached. The URLs may be specified individually, such as http://www.domain.com/dont_cache_me.html, or with wildcards, such as http://www.domain.com/dont_cache_directory/*.html for multiple files and http://*.no_cache_servers.domain.com/*.html for multiple machines. Each origin server 210 may have distinct cache criteria 222. For example, cache criteria 222 may specify that certain web pages that could be cached should not be cached, such as pages containing a user's credit card number. For another example, cache criteria 222 may specify that certain web pages should not be cached because the nature of the web page makes caching useless, such as credit card transactions which are only valid for that single credit card transaction.

Dispatch server 204 is coupled to data source 218 and cache server 202. Dispatch server 204 operates to expire content at cache server 202. Dispatch server 204 expires content at cache server 202 by sending data expiration commands 24 to cache server 202.

Cache server 202 and dispatch server 204 may both be located on a single physical computer system or may be located on separate computer systems. Further, cache server 202 may comprise multiple computer systems each providing caching services. For example, cache server 202 may comprise a server farm with a router (not shown) dispatching requests to individual elements of cache server 202 for handling.

Data expiration command 24 comprises any suitable message for expiring data at cache server 202. In the disclosed embodiment, data expiration command 24 comprises an ICSP terse message (described below).

The ICSP terse command may expire any of a single web page, a plurality of web pages at a single web site, a plurality of web pages at a plurality of web sites, a plurality of sites within a single domain and one or more specific objects on a web page, such as an image. For example, the ICSP tease command may expire a single web page such as http://www.domain.com/web_page.html. The ICSP terse command may expire a plurality of web pages at a single web site such as http://www.domain.com/web_pages/* which would expire all web pages in the "web_pages" directory at the site www.domain.com. The ICSP may expire a plurality of pages at a plurality of web sites such as http://*.domain.com/web_pages/* which would expire all web pages in the "web_pages" directory of each site in "domain.com". The ICSP terse command may expire a plurality of web sites such as http://*.domain.com which would expire all web pages on all sites in "domain.com". For another example, a single active server page (ASP) may result in many individual cached pages. A single ASP page may generate large numbers of individual cached pages because a single ASP page can dynamically create multiple different specific pages, such as http://www.domain.com/product_description.asp?category=_&product=_ may specify an ASP page that generates many specific product description pages based on a specified category and product. To cache server 202, product_description.asp?category=5&product=7, product_description.asp?category=5&product=6 and product_description.asp?category=3&product=7 specify three different cached pages. By expiring product_description.asp?category=*&product=7 ALL categories of product seven are expired, while not effecting product six related pages even though all of the pages were generated from a single ASP page.

Data links 208, 212 and 216 may comprise any suitable networking system or technology operable to support communication between DNS server 214, web client 206, cache system 200 and origin server 210. In the disclosed embodiment, data links 208, 212 and 216 each comprise a portion of the Internet.

In operation, origin server 210 contracts with cache system 200 for caching services. In order to provide caching services, an administrator associated with origin server 210 configures DNS server 206 or allows DNS server 206 to be configured to resolve one or more machine and domain names associated with origin server 210 to resolve to cache system 200 instead of origin server 210. Stated another way, after contracting for service, domain names and machine names associated with origin server 210 will translate into one or more IP addresses associated with cache system 200.

Web client 206 generates a data request for content from origin server 210. Web client 206 consults DNS server 214 over link 216 to translate the machine and domain name associated with origin server 210 into an IP address. Since origin server 210 has contracted for caching services from cache system 200, the IP address returned for origin server 210 is actually an IP address associated with cache system 200. The IP address associated with cache system 200 may be an IP address identifying cache server 202, a particular cache server 202 out of a farm of cache servers 202 or a router associated with a farm of cache servers 202 (not shown) for routing requests to a specific cache server 202 out of the farm of cache servers 202. Web client 200 then communicates the data request to cache system 200 over link 208 based on the IP address returned from DNS server 214.

Cache server 202 receives the data request from web client 206 and determines if the requested content is stored and current at cache server 202. If the requested content is stored and current at cache server 202 then cache server 202 will return the requested content to web client 206. If the requested content is either not stored or not current ("expired") at cache server 202, cache server 202 will retrieve the requested the data from origin server 210. After retrieving the requested data from origin server 210, cache server 202 will determine whether the requested data is cacheable based on caching criteria 222 for origin server 18. If the requested data is cacheable, then cache server 202 stores a copy of the requested data and returns a copy of the requested data to web client 206. In the disclosed embodiment, cache server 202 is operable to ignore the "no cache" directive associated with the HTTP protocol.

Trigger portion 220 of data source 218 generates data change message 28 indicating a change in the content or portions of content available from origin server 210 and stored in data source 218. Trigger portion 220 may also indicate a change in the data based on the time and date. For example, trigger portion 220 may know that certain content changes at periodic intervals at data source 218, such as when data source 218 is a file system and trigger portion 220 is a process monitoring the file system for changes, and generate data change message 28 for that content independently of detecting a change in the content.

Dispatch server 204 generates data expiration command 24. For example, dispatch server 204 may generate data expiration command 24 in response to a change in the content at data source 218. Specifically, dispatch server 204 generates data expiration command 24 in response to data change message 28 from data source 218. Dispatch server 204 may also generate data expiration command 24 in response to the elapsing of a predetermined time period. For example, if a previously received data change message 28 specified that the expiration of the data at cache server 202 should not occur for a set period of time, then dispatch server 204 will wait that set period of time before expiring data at cache server 202 by generating data expiration command 24.

The Internet Cache Synchronization Protocol (ICSP) is used to exchange messages to synchronize cached content with updated content. ICSP uses two levels of messages. ICSP Level 1 messages are sent with the HTTP protocol. ICSP Level 2 messages are sent via sockets on the same network level as, but independent of, the HTTP protocol. Both levels specify an ICSP request and an ICSP response. For both levels, an ICSP request typically specifies a list of URLs and the operations to perform on them, such as expiring them in the cache or removing them from a cache list. A request also includes a header specifying information about the protocol, domain, requesting agent IP and type, and time.

For both levels, the request message can be either terse or verbose. Cache servers, such as cache server 202, listen for terse messages, which indicate the action should occur immediately. Dispatch servers, such as dispatch server 204, listen for verbose messages, which indicate a particular time for the action to occur and specify the interval at which the action should reoccur.

TABLE 4

Request Header Fields

| Request Header Field | Meaning |
| --- | --- |
| Version | Protocol version, expressed as ICSP/x.x |
| Domain | Domain to which the message applies. For example, domain.com |
| Requesting-Agent-IP | The requesting agent IP. This can be omitted if you are already using HTTP. |
| Requesting-Agent-Type | The requesting agent type (ICSP Dispatcher or Client Gateway) |
| Request-Time | The time of the request in UTC format (milliseconds). |

Request Header Syntax for ICSP Level 1 Messages
The header is inserted into the HTTP header as shown in the following example.
    Version: ICSP/1.0\r\n
    Domain: domain.com \n
Note that "\n" represents a new-line character and "\r" a carriage return.
Request Header Syntax for ICSP Level 2 Messages
Unlike ICSP Level 1 request headers, a verbose request header is not inserted into an HTTP header. However, the Level 2 header must appear the same as an HTTP header, as shown in the following example:
    Version: ICSP/1.0\n
    Domain: domain.com \n\n
For terse requests, no header is required.
ICSP Verbose Request Message Body
In a verbose request, the message body contains messages that specify: an action to take, the URL on which to take the action, the time and interval at which the action on the URL will occur and the priority of the action on the URL.
Verbose Request Message Syntax:
    <Operation Code indicating action>\n
    URL upon which to take action\n
    UTC in milliseconds indicating when to take action\n
    Interval in milliseconds indicating when to repeat action \n
    Integer indicating action priority\n
    <Operation Code indicating end message>
The only required elements of the verbose request are the operation codes and the URL. The remaining elements will use default values if not specified. Specifically, the default value for the UTC is 1, which represents that the action should be taken immediately, the interval is zero which represents no repetition and the priority is three out of a one to five scale. Because there are no labels for these elements, the order in which they are listed is very important. Therefore the interval and priority may not be indicated without also indicating the UTC, because the interval's value would be interpreted as the UTC and the priority's value would be interpreted as the interval since the values are interpreted based on their position. However, elements may be omitted in reverse order of the syntax. For example, all elements except the priority may be specified, since priority is the last element positionally, or all elements except for the priority and interval, such these are the last two elements positionally.

TABLE 5 describes the actions and their associated operations codes that may be performed in a message. The actions are expire, add a new URL, remove a URL, rename a URL, and load a URL. For example, adding, loading, renaming and removing URLs may be used to modify caching criteria 202. To receive an immediate response on the status for any of the actions, the code for a response action and the operation code number, such as R0 or R2 should be used. The operation codes in TABLE 2 would be inserted at the <Operation Code indicating action> and the <Operation Code indicating end message> sections of the verbose request message as described above.

TABLE 5

Operation Codes for Verbose Messages

| Verbose Operation code | Meaning |
| --- | --- |
| <S0> | Expire URL. This request flushes an object associated with a URL from the cache. The URL is cached again until the next time it is requested. |
| <S1> | Add. This request adds a URL to the list of cached URLs. This allows a message to perform setup operations normally carried out in the administrative modules. |
| <S2> | Remove. This request removes a URL from the list of cached URLs. This allows a message to perform setup operations normally carried out in the administrative modules. |
| <S3> | Rename. This request renames a URL and can be used when a file, such as a gif or HTML page, is renamed. |
| <S4> | Load. This request expires the URL, and then loads it into the cache before the first request comes. This is useful for items such as the graphics, which appear on several pages and rarely change. The load could be issued so that the first user does not have to wait for all of the images to be cached. |
| <R0> | Respond to expiration request. |
| <R1> | Respond to request to add URL. |
| <R2> | Respond to request to remove URL. |
| <R3> | Respond to request to rename URL. |
| <R4> | Respond to request to load URL. |

Unlike send actions <S>, response actions <R> are synchronous. If in the message body there are no response actions, the entire message body is sent to dispatch server 204 at one time. However, if there are any response actions in the message body, that action must be sent to dispatch server 204 and on to cache server 202 and responded to before the remaining actions can be sent to dispatch server 204. Therefore, response actions can slow verbose messages.

For example, a verbose request messages may comprise:
    <S0>\n
    http://www.domain.com/index.html?param=value\n
    94000000000000\n
    100000\n
    1\n
    </S0>
URLs
The second element of the verbose request, following the operation code, is the URL upon which the specified action will take place. The URL is specified as the base URL and, optionally, one or more parameters. The URL can specify the value of one or more parameters and may include parameters, where applicable, for both POST and GET HTTP messages. The URL length is preferably no more than about 4 kilobytes, but may be longer in an alternate embodiment. ICSP level one messages are required to use URL style encoding because the ICSP level one message uses HTTP. Since the ICSP level two message uses sockets the URL encoding format is not required. Various examples are provided below for increased clarity. In each of the following examples, the action is to expire <S0> (i.e. expire a URL).

To expire a specific page, include the page name in the URL:
<S0>
http://www.domain.com/foresite/jobs/programmer.dml
</S0>
In this example, the action applies only to the specific page. For example, if the page contained an image named splash.gif and it too should be expired, then its URL of the image must also be specified in the message, as shown in the following example:
<S0>
http://www.domain.com/images/splash.gif
</S0>
To expire specific parameters with specific values include the specific parameters to expire. In this example, the action applies to this page only when the parameter position equals programmer and the parameter type equals fulltime.
<S0>
http://www.domain.com/foresite/
jobs?position=programmer&type=fulltime
</S0>
To expire specific pages, regardless of the value of the page's parameters, include the specific parameters to expire and indicate their value with a wildcard, represented by an asterisk (*) for multiple characters. Other suitable wildcards may also be used, such as a wildcard for a single character.
<S0>
http://www.domain.com/foresite/jobs?position=*&type=*<
/S0>
In this example, the action expires any page in the URL with values for position and type.
To expire a page, regardless of parameter name, value, or quantity all parameters may be replaced by an asterisk (*).
<S0>
http://www.domain.com/foresite/jobs?*<
/S0>
Time The third element of a request message body is time. The time that an action executes is specified in Universal Coordinate Time (UTC). Optionally, the time of execution may be specified as immediate, indicated by the value 1, and never, indicated by the value 999999999.
In the following example, a specific time is indicated to expire the URL and, thereafter, every 100 seconds.
   <S0>
   http://www.domain.com/index.html?param=value
   94000000000000
   100000
   <E>
In the next example, the request indicates to expire the URL now and, thereafter, every 100 seconds.
   <S0>
   http://www.domain.com/index.html?param=value
   1
   100000
   <E>
Priority The fourth element of the request message body is priority. For example, one of five priorities (1-5) may be assigned to a request. In general, all but the highest (1) priorities are relative and only apply to URLs within the specified domain. Other priority systems may be used in alternate embodiments of the present invention. Requests of higher priorities are guaranteed to execute before requests of lower priorities. The execution order of URLs within the same priority is first in, first out.

The only non-relative priority is the highest priority which, in this example, is 1. This priority means that the request may not be queued. It the request cannot be executed at the specified time, then it is not completed and generates an error.

In the following example, the request to remove a URL is given a priority level of 3.
   <S2>
   http://www.domain.com/whatsnew.html
   85000000000000
   0
   3
   <E>
ICSP Terse Request Message Body
In a terse request, the message body contains a message that specifies:
   An action to take
   The URL on which to take the action
In terse messages, the action is always expire. Because a terse request indicates the action should occur immediately, there is no need to specify time or a priority.
Terse Request Message Syntax:
   a?data type=data
where,
   a=the action
   ?=delimiter
   data type=the data type
   data=the actual URL
Terse Request Message Example:
   x?url=http://www.domain.com/index.html?param=value
The following sections describe each element of the terse request message.
Operation Codes for Terse Messages
TABLE 6 describes the actions that may be performed in a terse message.

TABLE 6

| Terse Operation code | Description |
| --- | --- |
| x | Expire. This request flushes an URL from the cache. The URL is cached again the next time it is requested. |
| n | Start flow control. This starts the flow control of a base URL by a flow control server such as server 134. |
| f | Stop flow control. This stops the flow control of a base URL by a flow control server such as server 134. |

ICSP Verbose Response Description
This section provides a description of the ICSP verbose response including:
   ICSP Response Header
   ICSP Response Message Body
Verbose Response Header
The ICSP verbose response header contains a message response and response code, as shown in the following example.
ICSP-Message:OK
ICSP-Code:100
ICSP Verbose Response Body
The ICSP verbose response body contains a message code and corresponding message text, as shown in the following example.

100: OK
ICSP Terse Response Description
The section provides a description of the ICSP terse response header. There is no message body associated with the response.
Terse Response Header
The ICSP terse response header contains the response code and corresponding message text, as shown in the following example.
100: OK
Ports For ICSP Level 1 (HTTP), both verbose and terse messages are listened for on port 9092, but another suitable port may alternatively be used.

For ICSP Level 2 (sockets), verbose messages are listened for on port 1370, and terse messages are listened for on port 1827, but another suitable port may alternatively be used.

Figure 6:
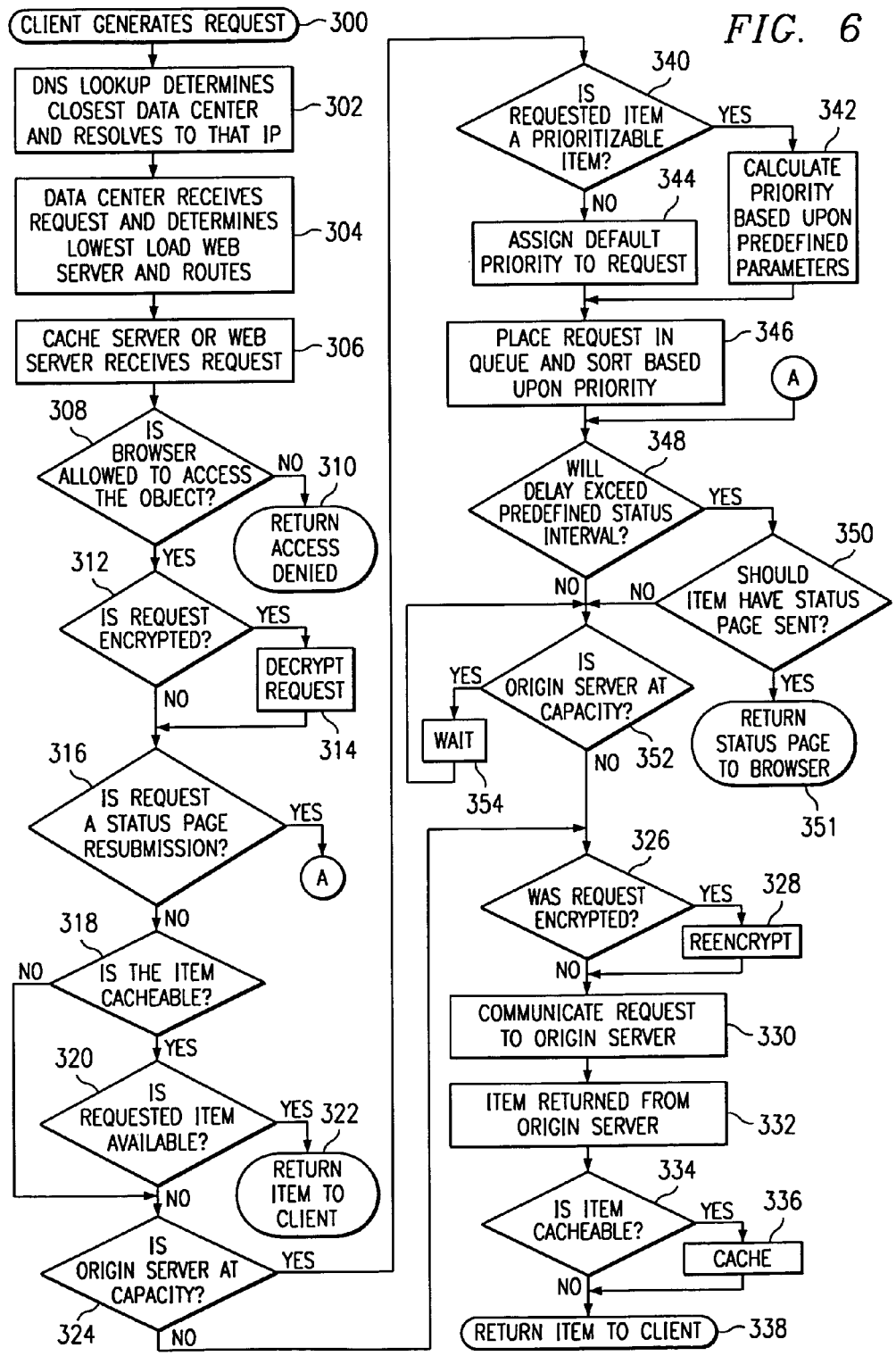
FIG. 6 is a flowchart illustrating the data caching and dynamic flow control method of the web content caching system of FIG. 1.

FIG. 6 is a flowchart illustrating the data caching and dynamic flow control method of system 10. The method begins at step 300 where client 11 generates request 22 for content using browser 12. Next, at step 302, the data center 14 closest in network distance to client 11 is determined. In the disclosed embodiment, a DNS lookup is performed on request 22 which resolves to the Internet protocol (IP) address of the data center 14 which is closest to client 11 in terms of network distance considering either or both of latency and hop count, or any other suitable metric for measuring network distance. Then, at step 304, data center 14 receives request and communicates request 22 to web server 30. Alternatively, request 22 is communicated to cache server 32 if web server 30 is not being used or has been merged into cache server 32. When cache server 32 and web server 30 are merged, cache server 32 provides all appropriate functionality described below as performed by web server 30. As web server 30 may comprise multiple physical servers each executing web server software, data center 14 may receive request 22 and then communicate request 22 to web server 30 having the lowest processing load. The processing load indicates, for example, the number of requests 22 which web server 30 is currently handling. For example, if web server 30 comprises two physical computers running web server software, and the first computer is handling ten requests while the second computer is handling only five requests, then data center 14 would route the next incoming request to the second computer. Proceeding to step 306, the chosen web server 30 receives request 22 and begins processing the received request 22.

Next, at step 308, web server 30 determines whether browser 12 which initiated request 22 is allowed to access the requested content. Web server 30 may use any authentication system suitable for authenticating requests 22, such as HTTP requests. If browser 12 is not allowed to access the requested content then the NO branch of decisional step 308 is followed to step 310. At step 310, web server 30 returns an access denied response to browser 12 and the processing of request 22 ends. If the user is allowed to access the object then the YES branch of decisional step 308 is followed to step 312.

At decisional step 312, web server 30 determines whether request 22 is encrypted. Request 22 may be encrypted in order to prevent the interception of the information contained within request 22. For example, if browser 12 and web server 30 are communicating using the Secure Sockets Layer (SSL) protocol then request 22 will be encrypted so that only browser 12 and web server 30 can read the contents of request 22. Common uses of SSL comprise transferring credit card information between browser 12 and web server 30 when performing electronic commerce. If request 22 is encrypted then the YES branch of decisional branch 112 is followed to step 314 where request 22 is decrypted. At step 314, request 22 may be decrypted using any of a variety of methods and the method proceeds to step 316. If the request is not encrypted then the NO branch of decisional step 312 is followed to decisional step 316. After the request is decrypted at step 314, the method proceeds to decisional step 316.

Then, at decisional step 316, web server 30 determines whether request 22 is a status page resubmission. As described in more detail in step 348, flow control server 34 may prevent cache server 32 from immediately requesting locally unavailable content from origin server 18. When cache server 32 is instructed to delay requesting locally unavailable content from origin server 18 by flow control server 34 then cache server 32 may return a status page to the user associated with browser 12 which includes status information associated with the delayed processing of the request. The status page may include an automatic resubmission mechanism for updating of the status page. For example, if the status page indicates a length of time that processing of request 22 will be delayed, then the status page may be automatically resubmitted after the stated period of time in order to get an update on the processing of the request. If request 22 is a status page resubmission, then the YES branch of decisional step 316 is followed to step 348. When request 22 is not a status page resubmission then the NO branch of decisional step 316 is followed to decisional step 318.

At decisional step 318, cache server 32 determines whether request 22 is requesting a cacheable item of content. Cache server 32 is operable to examine the contents of request 22 to determine whether the requested content item is cacheable. In the disclosed embodiment, the elements of the URL comprising request 22 are examined. Cache server 32 determines whether a content item is cacheable based on various configurable criteria. In the disclosed embodiment, the criteria determines whether the requested item of content is cacheable based on portions of the uniform resource locator (URL) associated with request 22. For example, when the URL associated with request 22 includes an authorization code for a particular electronic commerce transaction then the criteria can specify that the content item retrieved in response to request 22 should not be cached because electronic commerce authorization numbers are valid for only that one instance. In general, any portion or portions of the URL associated with request 22 may be used to determine whether the content item retrieved in response to request 22 is cacheable.

In addition, unneeded portions of a URL can be filtered to increase the amount of content that is cacheable and correspondingly decrease the load on origin server 18. For example, a URL comprising http://www.domain.com/e_commerce/cgi-bin/query?id=1&flight=32 may represent a request for dynamically generated output from a CGI script for a user with an identifier (id) of 1 for a flight schedule for flight number 32. Cache server 32 can be configured to cache and respond with the output of the URL while ignoring the "id=1" portion of the URL. For example, the identifier value may not impact the information presented. Future requests for flight schedules for flight number 32 can be handled by cache server 32 regardless of the value of the "id" portion of the URL. In contrast, traditional caching techniques do not ignore the "id" portion of the URL and pass each request for a flight schedule for flight number 32 to origin server 18 which causes an increased processing load at origin server 18. Thus, cache server 32 treats both requests: http://www.domain.com/e_commerce/cgi-bin/query?id=1&flight=32
http://www.domain.com/e_commerce/cgi-bin/query?id=2&flight=32 as requests for the same content, specifically, "flight=32" because cache server 32 has been configured to ignore the "id" portion. In contrast, traditional web caching techniques would pass both requests to origin server 18 for handling because the different "id" values could not be ignored.

When cache server 32 determines that the requested content item is cacheable then the YES branch of decisional step 318 is followed to decisional step 320. When the cache server determines that the requested content item is not cacheable then the NO branch of decisional step 318 is followed to decisional step 324.

Next, at step 320, cache server 32 determines whether the requested item is available. If the requested item is available then the YES branch of decisional step 320 is followed to step 322 and the requested item is retrieved from cache server 32 and returned to browser 12. If the requested item is not available then the NO branch of decisional step 320 is followed to decisional step 324.

Proceeding to decisional step 324, cache server 32 desires to request locally unavailable content from server 18 and is requesting permission from flow control server 34 to retrieve the locally unavailable content. Flow control server 34 determines whether origin server 18 is at capacity. To determine whether origin server 18 is at capacity, flow control server 34 may determine the current processor and network load at origin server 18. In the disclosed embodiment, a load monitoring application (not shown) is provided from data center 14 to origin server 18 when origin server 18 contracts for service from data center 14 for monitoring the load at origin server 18 and communicating the load information to flow control server 34 over network 13. Flow control server 34 may also use other metrics and other methods for measuring the current load at origin server 18. If origin server 18 is not at capacity then the NO branch of decisional step 324 is followed to step 326. If origin server 18 is at capacity then the YES branch of decisional step 324 is followed to step 340.

Then, at decisional step 326, cache server 32 has received permission from flow control server 34 to request locally unavailable content from origin server 18. Cache server 32 then determines whether request 22 was encrypted. If request 22 was encrypted then the YES branch of decisional step 326 is followed to step 328 where cache server 32 re-encrypts request 22 so that request 22 cannot be intercepted between cache server 32 and origin server 18. If the request was not encrypted then the NO branch of decisional step 326 is followed to step 330. Then, at step 330, request 22, whether it is encrypted or non-encrypted, is communicated to origin server 18. Next, at step 332, the content item requested by request 22 is returned from origin server 18 to cache server 32. Proceeding to decisional step 334, cache server 32 determines whether the content item retrieved from origin server 18 is cacheable. Cache server 32 may use criteria similar to that used in step 318, or may use a different set of criteria. If cache server 32 determines that the retrieved item is cacheable then the YES branch of decisional step 334 is followed to step 336 where cache server 32 stores a copy of the retrieved content item. If the item is not cacheable then the NO branch of decisional step 334 is followed to step 338. In step 338, regardless of whether the retrieved item is cacheable, the item is communicated to browser 12.

At decisional step 340, flow control server 34 has determined that origin server 18 is at capacity and the processing of request 22 may be delayed. At step 340 flow control server 34 determines whether request 22 is requesting a prioritizable content item. Flow control server 34 determines whether the requested content item is prioritizable based on various criteria. For example, at an electronic commerce web site, a request could be prioritized based on information previously gathered about the user associated with the request, such as how much the user has previously spent at the electronic commerce web site. The amount the user has previously spent could be used to give that user a high priority because of the user's repeat business, while a first time shopper could have a lower priority because the first time shopper has a lower chance of purchasing an item. Continuing the electronic commerce web site example, the type of request from the user could be considered, such as whether the request is for more information about an item or a buy request for an item. Higher priority could be attached to the request to buy an item that the request for further information. If the requested item is a prioritizable item then the YES branch of decisional step 340 is followed to step 342 where a priority is associated with request 22 based upon the criteria and any of request 22, the data requested by request 22 and external information associated with request 22 in any suitable combination. The external information comprises information which is not part of request 22 itself, but has been associated with request 22 and the user which generated request 22. For example, the external information may comprise historical shopping, statistical or other information collected about the user which generated request 22. Request 22 is evaluated against the criteria using request 22, the data requested by request 22 and external information associated with request 22 in order to determine the priority to be associated with request 22. The method then continues to step 346. If the requested item is not prioritizable then the NO branch of decisional step 340 is followed to step 344 where a default priority is assigned to the request. The method then continues to step 346.

In the disclosed embodiment, the priority is a numeric value, but any suitable value which has order may be used. For example, an equation could be used to weigh multiple factors in order to come up with a single priority value. The numeric values range from 1 to 100, inclusive, where higher values indicate higher priority. The default priority may be set to any value as desired by an administrator associated with origin server 18 and in the disclosed embodiment may be from 1 to 100, inclusive. When a significant portion of the content available at origin server 18 is prioritizable, the default priority may be set to a low value, such as 25, because only unimportant activities are non-prioritizable. When a significant portion of the content available at origin server 18 is non-prioritizable, the default priority may be set to a middle value, such as 50, and the prioritizable items given high and low priorities based on their relative importance. The middle value default priority may be used because most requests are roughly equal in importance to the administrator associated with origin server 18. Any suitable distribution, formula or other method of calculating priorities may be used with any suitable value for the default priority based on the desires of the administrator. Origin servers 18 may have each distinct priority policies associated therewith so that flow control server 34 can provide customized prioritizing service to each origin server 18.

Next, at step 346, the prioritized request is placed in a queue. The queue is sorted based on the priority associated with the prioritized request so that the highest priority requests are handled first.

Proceeding to decisional step 348, flow control server 34 determines whether the delay before the prioritized request is handled by origin server 18 exceeds a predetermined time limit. The time limit is configurable based on origin server 18. Specifically, since each data center 14 may be serving multiple distinct origin servers 18, each respective origin server 18 may have differing requirements for the status page and the time limit. Thus, flow control server 34 is operable to provide differing time limits and status pages based on the particular origin server request 22 was intended for. The status page is also configurable as a function of request 22. If the delay is greater than the predetermined time limit then the YES branch of decisional step 348 is followed to decisional step 350. At decisional step 350, flow control server 34 determines whether the requested item should have a status page sent.

The status page may comprise any suitable HTML data for use with browser 12. The location of the status page is indicated by flow control server 34 to provide information regarding the status of the processing of request 22 to the user associated with browser 12. The status page may be located at, for example, cache server 32 or at other suitable locations. In situations where origin server 18 is incapable of handling the volume of requests for locally unavailable content, the status page may be generated. The status page may include an automatic resubmission element which causes browser 12 to communicate the status page back to web server 30 after a predetermined period of time. The status page may be resubmitted in order to update the status page with the status of request 22 after the predetermined time has elapsed or to return the content originally requested if the originally requested content is available.

If the requested item should have a status page sent then the YES branch of decisional step 350 is followed to step 351 where a status page is communicated to browser 12 to inform the user associated with browser 12 of the status of request 22. If no status page should be sent then the NO branch of decisional step 350 is followed to decisional step 352. If the delay before the prioritized request is handled is below the predetermined time period then the NO branch of decisional step 348 is followed to step 352.

At decisional step 352, flow control server 34 determines whether origin server 18 is still at full processing capacity. If origin server 18 is not at full capacity then the NO branch of decisional step 352 is followed to step 326 where the highest priority request in the priority queue is communicated to origin server 18 for handling. If origin server 18 is at capacity, for example because origin server 18 is handling content requests previously communicated to origin server 18, then the YES branch of decisional step 352 is followed to step 354. At step 354, flow control server 34 waits a predetermined period of time before returning to step 352 and determining whether origin server 18 is still at capacity. For example, flow control server 34 may wait 100 milliseconds before determining whether origin server 18 has dropped below capacity.

System 10 provides numerous capabilities for improving web server performance and reliability. System 10 provides the capability to dynamically expire content for fine grained control of whether cached data is valid or invalid. Changes at a data store, such as data source 20, can be quickly detected and the cached data from the data store expired so that out-of-date information is not provided to a user. An administrator associated with a web site, such as origin server 18, can now determine in real-time when cached content should be expired. In contrast, administrators have traditionally had to determine when content should be expired when the user initially retrieves the content from the web server because traditional expiration times were fixed and provided as part of the content. Because the administrator could not provide for unexpected changes in the content, such as a flight in a flight schedule being cancelled, administrators often used extremely short expiration times to ensure that current data is provided to users. The short expiration times cause unnecessary increased load on the servers at the web site because content could only be cached for short periods of time before being re-retrieved from the web site, even though the cached data might still be correct.

Also, system 10 provides the ability to cache both static and dynamic content. By caching both static and dynamic content remotely from a web site, the processing and network load on the web site is decreased. The processing load is decreased because the web site no longer has to generate multiple instances of dynamic data. The network load is decreased because many requests for content can be handled by a data center, such as data center 14, where the content is cached instead of using the web site, such as origin server 18, to handle the requests. Caching of both static and dynamic data allows a web site to off-load the handling and providing of not only simple static content, but many items of both static and dynamic content.

Further, system 10 provides the capability to cache portions of dynamic content and configurably determine which portions to cache based on instructions from an administrator associated with a web site. This capability greatly increases the type and variety of dynamic content which can be cached by system 10. This capability also increases the effectiveness of the caching performed by system 10 because system 10 can filter the requests. Filtering requests allows system 10 to determine that distinct requests with differing content requests are actually requesting already cached content. This decreases the load experienced by the web site.

In addition, system 10 can control the load experienced by a web site, such as origin server 18, by prioritizing and controlling the flow of requests to the web site. An administrator associated with the web site can request that system 10 not allow the processing and network load to exceed certain thresholds. Thus, the administrator can now make various assumptions about the volume and frequency of requests that will be experienced by a server associated with the web site and plan accordingly. Also, by prioritizing the requests, the delay experienced by a user who is requesting content from a busy web site can be tailored by the administrator to provide appropriate service to the users of the administrator's web site.

Also, system 10 allows a particular site, such as origin server 18, to purchase sufficient bandwidth and processing capability to handle the normal expected load on the site, while system 10 handles the spikes in load on the site. This provides numerous cost savings to the site because the site does not need to purchase and maintain large amounts of processing capability and bandwidth that sit around unused except during the heaviest traffic.

It should also be recognized that direct connections disclosed herein could be altered such that two disclosed components or elements would be coupled to one another through an intermediate device or devices without being directly connected, while still realizing the present invention. Other changes, substitutions and alterations are also possible without departing from the spirit and scope of the present invention, as defined by the following Claims.

What is claimed is:
1. A method for processing data comprising:
storing a data item at a cache server, the data item being accessed by a data request from a remote computer, the data item stored at the cache server being based on underlying content maintained at a data source, the data request including a uniform resource locator associated with the data item;
receiving at a data center manager a data change message from a trigger associated with the data source, the data change message generated in response to a change in the underlying content at the data source for the data item;

generating an expiration command at the data center manager in response to the data change message;

receiving the expiration command at the cache server from the data center manager; and marking the data item at the cache server as expired according to the expiration command;

controlling, by a flow control server, retrieval by the cache server of the data item from an origin server, wherein controlling retrieval comprises:

determining at the flow control server a current load associated with the origin server;

prioritizing at the flow control server the data item; and determining when the cache server retrieves the data item based on the current load of the origin server and the priority of the data item.

2. The method for processing data according to claim 1 further comprising:

receiving a data request at the cache server from remote computer, the data request requesting the data item from the cache server;

determining whether the data item is available at the cache server;

retrieving the data item from the origin server when the data item is unavailable at the cache server, the origin server retrieving the underlying content from the data source to produce the data item; and communicating the data item from the cache server to the remote computer.

3. The method for processing data according to claim 2 wherein the data item comprises a web page and further comprising generating the web page at the origin server.

4. The method for processing data according to claim 3, wherein generating the web page comprises generating the web page based on the data request.

5. The method for processing data according to claim 2, wherein determining whether the data item is available comprises:

determining whether the data item is present at the cache server; and determining whether the data item is current when the data item is present at the cache server.

6. The method for processing data according to claim 1, wherein determining when the cache server retrieves the data item comprises:

granting permission to the cache server when the current load of the origin server is below a predetermined threshold; and denying permission to the cache server when the current load of the origin server exceeds the predetermined threshold.

7. The method for processing data according to claim 1 further comprising generating the expiration command at the data center manager in response to the elapsing of a predetermined period of time.

8. The method for processing data according to claim 1, wherein generating the expiration command comprises:

detecting a change in the underlying content at the data source by a trigger associated with the underlying content;

generating the data change message indicating at least one change in the underlying content; and communicating the data change message to the data center manager.

9. The method for processing data according to claim 1, wherein marking the data as expired comprises receiving the expiration command from the data center manager and determining the data item to expire as a function of the expiration command.

10. The method for processing data according to claim 9, wherein the expiration command expires a single web page.

11. The method for processing data according to claim 9, wherein the expiration command expires a plurality of web pages.

12. The method for processing data according to claim 9, wherein the expiration command expires a plurality of web pages at a plurality of web sites.

13. The method for processing data according to claim 9, wherein the expiration command expires a plurality of web pages at a plurality of domains.

14. The method for processing data according to claim 1, wherein the data item comprises a web page using the hypertext markup language.

15. The method for processing data according to claim 1, wherein the expiration command comprises an Internet Cache Synchronization Protocol command.

16. The method for processing data according to claim 15, wherein the expiration command comprises an Internet Cache Synchronization Protocol terse command and further including generating the expiration command at the data center manager in response to an Internet Cache Synchronization Protocol verbose command.

17. The method for processing data according to claim 1, wherein the data item has an associated request element identifying the data item, the request element having a first portion and a second portion distinct from the first portion and wherein the data item is accessed at the cache server by:

filtering the first portion of the request element based on predetermined criteria associated with an origin server associated with the data item; and identifying the data item based on the second portion of the request element.

18. The method for processing data according to claim 17 further comprising:

receiving a data request at the cache server, a first portion of the data request being distinct from the first portion of the request element and a second portion of the data request being substantially similar to the second portion of the request element; and retrieving the data item as a function of the second portion of the data request and the second portion of the request element.

19. The method for processing data according to claim 18, wherein the request element comprises a uniform resource locator and the data request comprises a uniform resource locator.

20. A method for providing efficient data access service comprising:

subscribing an origin server to a data center;

routing a data request from a browser to the data center, the data request requesting a dynamic content item and having an associated address indicating the origin server, the data request including a uniform resource locator associated with the dynamic content item;

receiving at a data center manager, before expiration of the dynamic content item, a data change message from a trigger at a data source associated with the dynamic content item, the data change message generated in response to a change in the underlying content for the dynamic content item maintained at the data source;

generating an expiration command at the data center manager in response to the data change message;

receiving the expiration command from the data center manager;

updating an expiration time of the dynamic content item in accordance with the expiration command;

determining whether the dynamic content item is available at the data center according to the expiration time of the dynamic content item;

generating the dynamic content item at the origin server from the underlying content at the data source when the dynamic content item is unavailable at the data center;

retrieving the dynamic content item from the origin server when the dynamic content item is unavailable at the data center; and communicating the dynamic content item to the browser;

controlling, by a flow control server, retrieval of the data item from the origin server, wherein controlling retrieval comprises:

determining at the flow control server a current load associated with the origin server;

prioritizing at the flow control server the data item; and determining when the data item is retrieved based on the current load of the origin server and the priority of the data item.

21. The method for providing efficient data access service according to claim 20, wherein subscribing the origin server comprises transferring domain name resolution service to the data center and wherein routing the data request comprises resolving the address associated with the origin server.

22. The method for providing efficient data access service according to claim 20, wherein determining whether the dynamic content item is available comprises:

determining whether the dynamic content item is present at the data center; and determining whether the dynamic content item is current when the dynamic content item is present at the data center.

23. A system for processing data comprising:

a data center operable to receive a request from a client;

a data source operable to maintain underlying content for data items cached at the data center; and a data center manager coupled to the data source and the data center, the data source operable to generate a data change message in response to a change in the underlying content maintained at the data source for a particular data item cached at the data center, the particular data item being accessed by a data request from a remote computer, the data request including a uniform resource locator associated with the particular data item, and the data center manager operable to receive the data change message and generate an expiration message in response to the data change message indicating an expiration of the particular data item, the data center manager operable to send the expiration message to the data center;

wherein the data center is operable to control retrieval of the particular data item by:

determining a current load associated with an origin server;

prioritizing the particular data item; and determining when the particular data item is retrieved based on the current load of the origin server and the priority of the data item.

24. The system for processing data according to claim 23, wherein the data center comprises a web server, a cache server and a flow control server, the flow control server operable to control retrieval of the particular data item.

25. The system for processing data according to claim 24, wherein the web server is operable to receive the request from the client, wherein the cache server is operable to cache data items, and wherein the flow control server is operable to prioritize the request and control access to an to the origin server and the data source for the cache server for retrieval of data items not cached at the cache server.

* * * * *